(12) United States Patent
Li

(10) Patent No.: US 10,129,814 B2
(45) Date of Patent: Nov. 13, 2018

(54) METHOD AND APPARATUS FOR JOINING CENTRALIZED CLUSTER

(71) Applicant: Huawei Technologies Co., Ltd., Shenzhen (CN)

(72) Inventor: Dejian Li, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 322 days.

(21) Appl. No.: 15/066,620

(22) Filed: Mar. 10, 2016

(65) Prior Publication Data

US 2016/0198393 A1 Jul. 7, 2016

Related U.S. Application Data

(63) Continuation of application No. PCT/CN2014/084738, filed on Aug. 19, 2014.

(30) Foreign Application Priority Data

Sep. 11, 2013 (CN) .......................... 2013 1 0413769

(51) Int. Cl.
*H04W 40/32* (2009.01)
*H04W 48/12* (2009.01)
(Continued)

(52) U.S. Cl.
CPC ......... *H04W 40/32* (2013.01); *H04W 40/244* (2013.01); *H04W 40/246* (2013.01);
(Continued)

(58) Field of Classification Search
None
See application file for complete search history.

(56) References Cited

U.S. PATENT DOCUMENTS

| 8,503,377 B2 * | 8/2013 | Cordeiro | H04W 48/16 370/329 |
| 2002/0176437 A1 * | 11/2002 | Busch | H04W 16/10 370/437 |

(Continued)

FOREIGN PATENT DOCUMENTS

| CN | 103024891 A | 4/2013 |
| CN | 103118406 A | 5/2013 |

(Continued)

OTHER PUBLICATIONS

"Part 15.3: Wireless Medium Access Control (MAC) and Physical Layer (PHY) Specifications for High Rate Wireless Personal Area Networks (WPANs)—Amendment 2: Millimeter-wave-based Alternative Physical Layer Extension", IEEE Std 802.15.3c, Oct. 12, 2009, 203 pages.

(Continued)

*Primary Examiner* — Hassan A Phillips
*Assistant Examiner* — Gautam Sharma

(57) ABSTRACT

A method and an apparatus for joining a centralized cluster is disclosed. The method includes: receiving a DMG Beacon frame sent by a first S-AP, where the DMG Beacon frame includes cluster information of the first S-AP; measuring, according to the cluster information of the first S-AP, signal quality and a state of each Beacon SP included in a BI of the first S-AP; if a Beacon SP whose state is an idle state is obtained by means of measurement, associating the Beacon SP with the first S-AP as a non-PCP/non-AP station, and receiving an Announce frame sent by the first S-AP; selecting one S-AP from the first S-AP and the second S-AP as a to-be-joined S-AP; and joining a centralized cluster of the to-be-joined S-AP.

24 Claims, 7 Drawing Sheets

(51) Int. Cl.
*H04W 40/24* (2009.01)
*H04W 84/12* (2009.01)

(52) U.S. Cl.
CPC ......... *H04W 40/248* (2013.01); *H04W 48/12* (2013.01); *H04W 84/12* (2013.01)

(56) References Cited

U.S. PATENT DOCUMENTS

| | | |
|---|---|---|
| 2011/0110340 A1 | 5/2011 | Lakkis |
| 2011/0199966 A1 | 8/2011 | Cordeiro et al. |
| 2013/0077610 A1 | 3/2013 | Amini et al. |
| 2013/0088983 A1* | 4/2013 | Pragada ............... H04W 16/14 370/252 |
| 2013/0176993 A1* | 7/2013 | Trainin ............. H04W 74/0808 370/336 |
| 2015/0382200 A1 | 12/2015 | Li |
| 2016/0007234 A1 | 1/2016 | Li |
| 2016/0007277 A1 | 1/2016 | Li |
| 2017/0318621 A1* | 11/2017 | Irie ....................... H04W 84/12 |

FOREIGN PATENT DOCUMENTS

| | | |
|---|---|---|
| CN | 103179572 A | 6/2013 |
| CN | 103179639 A | 6/2013 |
| CN | 103491632 A | 1/2014 |

OTHER PUBLICATIONS

"Part 11: Wireless LAN Medium Access Control (MAC) and Physical Layer (PHY) specifications—Amendment 5: Enhancements for Very High Throughput to Support Chinese Millimeter Wave Frequency Bands (60 GHz and 45 GHz)", IEEE P802.11aj/D2.0, May 2016, 312 pages.

"High Rate 60 GHz PHY, MAC and PALS", ecma International, Standard ECMA-387, 2nd Edition, Dec. 2010, 302 pages.

"Part 11: Wireless LAN Medium Access Control (MAC) and Physical Layer (PHY) Specifications—Amendment 3: Enhancements for Very High Throughput in the 60 GHz Band", IEEE Std 802.11ad, Dec. 28, 2012, 628 pages.

Brian Hart, "Enterprise Extensions normative text", Cisco Systems, Apr. 13, 2011, 26 pages.

Dejian Li, "CentralizedClustering Resolution to CID 127", Huawei/HiSilicon, Mar. 18, 2014, 14 pages.

* cited by examiner

| Element ID | Duration | Request token | Reported BI duration | Next BTI offset time | Clustering control report | Available cluster offset bitmap | Cluster channel number |
|---|---|---|---|---|---|---|---|
| 1 | 1 | 1 | 2 | 4 | 8 | 4 | 1 |

Byte

METHOD AND APPARATUS FOR JOINING CENTRALIZED CLUSTER

CROSS-REFERENCE TO RELATED APPLICATIONS

This application is a continuation of International Application No. PCT/CN2014/084738, filed on Aug. 19, 2014, which claims priority to Chinese Patent Application No. 201310413769.1, filed on Sep. 11, 2013, both of which are hereby incorporated by reference in their entireties.

TECHNICAL FIELD

The present invention relates to the communications field, and in particular, to a method and an apparatus for joining a centralized cluster.

BACKGROUND

In the IEEE 802.11ad WLAN (Wireless Local Area Network, wireless local area network), it is defined that a group of devices form a BSS (Basic Service Set, basic service set) and a PBSS (Personal Basic Service Set, personal basic service set), and a PCP/AP (PBSS Control Point/Access Point, PBSS control point/access point) in the PBSS or the BSS can provide, for a STA (Station, Station) in the PBSS or the BSS, a basic timing service and an allocation service of a channel access period such as an SP (Scheduled Service Period, scheduled service period) and a CBAP (Contention-Based Access Period, contention-based access period).

In a network environment in which BSSs are densely deployed, severe co-channel interference may exist between BSSs on adjacent work stations, and in the IEEE 802.11 ad, when co-channel interference exists between BSSs, a centralized PCP/AP cluster mechanism can be used to improve space utilization efficiency and suppress interference. A centralized PCP/AP cluster includes one S-AP (Synchronization AP, synchronization AP) and a group of cluster members PCP/APs, and the S-AP provides a service such as synchronization for the cluster members PCP/APs. Therefore, for any PCP/AP, how to join a centralized cluster of an S-AP and become a cluster member of the centralized cluster is a key step to form a centralized cluster, and is also an urgent problem that needs to be resolved at present.

SUMMARY

For a purpose of joining a centralized cluster, the present invention provides a method and an apparatus for joining a centralized cluster. The technical solutions are as follows:

According to a first aspect, a method for joining a centralized cluster is provided, where the method includes:

receiving a directional multi-gigabit beacon frame DMG Beacon frame sent by a first synchronization access point S-AP, where the DMG Beacon frame includes cluster information of the first S-AP;

measuring, according to the cluster information of the first S-AP, signal quality and a state of each beacon scheduled service period Beacon SP included in a beacon interval BI of the first S-AP;

if a Beacon SP whose state is an idle state is obtained by means of measurement, associating the Beacon SP with the first S-AP as a non-personal basic service set control point PCP/non-access point AP station (STA), and receiving an announce frame sent by the first S-AP, where the Announce frame includes cluster information of a second S-AP and an available cluster offset bitmap of the first S-AP, the second S-AP is another S-AP, except the first S-AP, on each channel in a channel group in which the first S-AP is located, and the available cluster offset bitmap of the first S-AP is used to store the state of each Beacon SP included in the BI of the first S-AP;

selecting one S-AP from the first S-AP and the second S-AP as a to-be-joined S-AP according to the available cluster offset bitmap of the first S-AP, the signal quality and the state of each Beacon SP included in the BI of the first S-AP, and the cluster information of the second S-AP; and joining a centralized cluster of the to-be-joined S-AP.

In a first possible implementation manner of the first aspect, the cluster information of the first S-AP includes BI duration, cluster synchronization information, and clustering control information of the first S-AP, and an identity of a channel on which the first S-AP is located; and the measuring, according to the cluster information of the first S-AP, signal quality and a state of each beacon scheduled service period Beacon SP included in a beacon interval BI of the first S-AP includes:

determining, according to the cluster synchronization information, the BI duration, and the clustering control information of the first S-AP, a timing start moment of each Beacon SP included in the BI of the first S-AP; and performing, on the channel corresponding to the identity of the channel on which the first S-AP is located and according to the timing start moment of each Beacon SP included in the BI of the first S-AP, measurement on each Beacon SP included in the BI of the first S-AP, and obtaining, by means of measurement, the signal quality and the state of each Beacon SP included in the BI of the first S-AP.

In a second possible implementation manner of the first aspect, the selecting one S-AP from the first S-AP and the second S-AP as a to-be-joined S-AP according to the available cluster offset bitmap of the first S-AP, the signal quality and the state of each Beacon SP included in the BI of the first S-AP, and the cluster information of the second S-AP includes:

if a ratio of a quantity of Beacon SPs whose signal quality exceeds a preset threshold to a quantity of Beacon SPs whose state is an occupied state is greater than a preset ratio, determining, according to the available cluster offset bitmap of the first S-AP and the signal quality and the state of each Beacon SP included in the BI of the first S-AP, whether to join a centralized cluster of the first S-AP; and if it is determined to join the centralized cluster of the first S-AP, determining the first S-AP as the to-be-joined S-AP.

With reference to the second possible implementation manner of the first aspect, in a third possible implementation manner, the determining, according to the available cluster offset bitmap of the first S-AP and the signal quality and the state of each Beacon SP included in the BI of the first S-AP, whether to join a centralized cluster of the first S-AP includes:

forming a measured cluster offset bitmap of the first S-AP, where the measured cluster offset bitmap of the first S-AP is used to store the state, obtained by means of measurement, of each Beacon SP included in the BI of the first S-AP;

performing an intersection operation on the Beacon SP that is included in the BI of the first S-AP, whose state is the idle state, and that is obtained by means of measurement, and a Beacon SP whose state stored in the available cluster offset bitmap of the first S-AP is an idle state;

performing a correlation operation on the measured cluster offset bitmap of the first S-AP and the available cluster offset bitmap of the first S-AP, so as to obtain a correlation of the measured cluster offset bitmap of the first S-AP; and if a result of the intersection operation is not null and the correlation of the measured cluster offset bitmap of the first S-AP is greater than a preset correlation threshold, determining to join the centralized cluster of the first S-AP; otherwise, determining not to join the centralized cluster of the first S-AP.

With reference to the second possible implementation manner of the first aspect, in a fourth possible implementation manner, the method further includes:

if it is determined not to join the centralized cluster of the first S-AP, measuring, according to the cluster information of the second S-AP, signal quality and a state of each Beacon SP included in a BI of the second S-AP;

calculating a ratio of a quantity of Beacon SPs that are included in the BI of the second S-AP and whose signal quality exceeds the preset threshold to a quantity of Beacon SPs that are included in the BI of the second S-AP and whose state is an occupied state; and selecting a second S-AP with a highest ratio, and determining the second S-AP with the highest ratio as the to-be-joined S-AP.

With reference to the fourth possible implementation manner of the first aspect, in a fifth possible implementation manner, the Announce frame further includes an available cluster offset bitmap of the second S-AP, where the available cluster offset bitmap of the second S-AP is used to store the state of each Beacon SP included in the BI of the second S-AP; and the determining the second S-AP with the highest ratio as the to-be-joined S-AP includes:

forming a measured cluster offset bitmap of the second S-AP with the highest ratio, where the measured cluster offset bitmap of the second S-AP with the highest ratio is used to store a state, obtained by means of measurement, of each Beacon SP included in a BI of the second S-AP with the highest ratio;

performing an intersection operation on a Beacon SP that is included in the BI of the second S-AP with the highest ratio and whose state is an idle state, and a Beacon SP whose state stored in an available cluster offset bitmap of the second S-AP with the highest ratio is an idle state;

performing a correlation operation on the measured cluster offset bitmap of the second S-AP with the highest ratio and the available cluster offset bitmap of the second S-AP with the highest ratio, so as to obtain a correlation of the measured cluster offset bitmap of the second S-AP with the highest ratio; and if a result of the intersection operation is not null and the correlation of the measured cluster offset bitmap of the second S-AP with the highest ratio is greater than a preset correlation threshold, determining to join a centralized cluster of the second S-AP with the highest ratio.

With reference to the fifth possible implementation manner of the first aspect, in a sixth possible implementation manner, the method further includes:

if the result of the intersection operation is null or the correlation of the measured cluster offset bitmap of the second S-AP with the highest ratio is less than or equal to the preset correlation threshold, selecting a second S-AP with a highest ratio from an unselected second S-AP.

With reference to the first aspect or any one of the first to the sixth possible implementation manners of the first aspect, in a seventh possible implementation manner, the channel group includes one first channel and two second channels, where a bandwidth resource occupied by the first channel is the same as that occupied by the two second channels, and the first channel overlaps the two second channels in frequency; and if a PCP/AP is a PCP/AP located on the second channel, after the joining a centralized cluster of the to-be-joined S-AP, the method further includes:

receiving cluster information, sent by the to-be-joined S-AP, of a new S-AP newly joining the first channel, measuring, according to the cluster information of the new S-AP, signal quality and a state of each Beacon SP included in a BI of the new S-AP, and determining, according to the signal quality and the state of each Beacon SP included in the BI of the new S-AP, whether to join a centralized cluster of the new S-AP.

With reference to the first aspect or any one of the first to the seventh possible implementation manners of the first aspect, in an eighth possible implementation manner, the cluster information of the second S-AP includes BI duration, cluster synchronization information, and clustering control information of the second S-AP, and an identity of a channel on which the second S-AP is located;

the Announce frame includes an extended cluster report information element IE of the second S-AP, where the extended cluster report IE includes a reported BI duration field, a next beacon transmission interval BTI offset field, a clustering control report field, and a cluster channel number field; and the reported BI duration field is used to carry the BI duration of the second S-AP, the next BTI offset field is used to carry the cluster synchronization information of the second S-AP, the clustering control report field is used to carry the clustering control information of the second S-AP, and the cluster channel number field is used to carry the identity of the channel on which the second S-AP is located.

With reference to the eighth possible implementation manner of the first aspect, in a ninth possible implementation manner, the Announce frame further includes the available cluster offset bitmap of the second S-AP, and the extended cluster report IE further includes an available cluster offset bitmap field, where the available cluster offset bitmap field is used to carry the available cluster offset bitmap of the second S-AP.

According to a second aspect, a method for joining a centralized cluster is provided, where the method includes:

sending a directional multi-gigabit beacon frame DMG Beacon frame to a personal basic service set control point/access point PCP/AP, where the DMG Beacon frame includes cluster information of a first synchronization access point S-AP, so that the PCP/AP measures, according to the cluster information of the first S-AP, signal quality and a state of each beacon scheduled service period Beacon SP included in a beacon interval BI of the first S-AP; and if a Beacon SP whose state is an idle state is obtained by means of measurement by the PCP/AP, associating the Beacon SP with the PCP/AP, and sending an announce frame to the PCP/AP, where the Announce frame includes cluster information of a second S-AP and an available cluster offset bitmap of the first S-AP, the second S-AP is another S-AP, except the first S-AP, on each channel in a channel group in which the first S-AP is located, and the available cluster offset bitmap of the first S-AP is used to store the state of each Beacon SP included in the BI of the first S-AP, so that the PCP/AP selects one S-AP from the first S-AP and the second S-AP as a to-be-joined S-AP according to the available cluster offset bitmap of the first S-AP, the signal quality and the state of each Beacon SP included in the BI of the first S-AP, and the cluster information of the second S-AP, and joins a centralized cluster of the to-be-joined S-AP.

In a first possible implementation manner of the second aspect, the channel group includes one first channel and two second channels, where a bandwidth resource occupied by the first channel is the same as that occupied by the two second channels, and the first channel overlaps the two second channels in frequency; and the method further includes:

receiving cluster information, sent by a centralized coordination service root CCSR, of a new S-AP newly joining the first channel, and broadcasting, by using an extended cluster report information element IE, the cluster information of the new S-AP to all PCP/APs included in a centralized cluster of the first S-AP, so that a PCP/AP located on the second channel determines, according to the cluster information of the new S-AP, whether to join a centralized cluster of the new S-AP.

With reference to the first possible implementation manner of the second aspect, in a second possible implementation manner, the broadcasting, by using an extended cluster report information element IE, the cluster information of the new S-AP to all PCP/APs included in a centralized cluster of the first S-AP includes:

broadcasting an Announce frame or a DMG Beacon frame to all the PCP/APs included in the centralized cluster of the first S-AP, where the Announce frame or the DMG Beacon frame includes the extended cluster report IE, and the extended cluster report IE includes the cluster information of the new S-AP.

With reference to the first possible implementation manner of the second aspect, in a third possible implementation manner, the method further includes:

if it is determined to join the centralized cluster of the new S-AP, broadcasting, by using a DMG Beacon frame or an Announce frame, a cluster switching announcement IE to all the PCP/APs included in the centralized cluster of the first S-AP, so as to broadcast a cluster switching decision of the first S-AP to all the PCP/APs included in the centralized cluster of the first S-AP.

With reference to the first possible implementation manner of the second aspect, in a fourth possible implementation manner, after the receiving cluster information, sent by a centralized coordination service root CCSR, of a new S-AP newly joining the first channel, the method further includes:

if the first S-AP is located on the second channel, measuring, according to the cluster information of the new S-AP, signal quality and a state of each Beacon SP included in a BI of the new S-AP, and determining, according to the signal quality and the state of each Beacon SP included in the BI of the new S-AP, whether to join the centralized cluster of the new S-AP.

According to a third aspect, an apparatus for joining a centralized cluster is provided, where the apparatus includes:

a receiving module, configured to receive a directional multi-gigabit beacon frame DMG Beacon frame sent by a first synchronization access point S-AP, where the DMG Beacon frame includes cluster information of the first S-AP;

a measurement module, configured to measure, according to the cluster information of the first S-AP that is received by the receiving module, signal quality and a state of each beacon scheduled service period Beacon SP included in a beacon interval BI of the first S-AP;

an association module, configured to: if a Beacon SP whose state is an idle state is obtained by means of measurement by the measurement module, associate the Beacon SP with the first S-AP as a non-personal basic service set control point PCP/non-access point AP station (STA), and receive an announce frame sent by the first S-AP, where the Announce frame includes cluster information of a second S-AP and an available cluster offset bitmap of the first S-AP, the second S-AP is another S-AP, except the first S-AP, on each channel in a channel group in which the first S-AP is located, and the available cluster offset bitmap of the first S-AP is used to store the state of each Beacon SP included in the BI of the first S-AP;

a selection module, configured to select one S-AP from the first S-AP and the second S-AP as a to-be-joined S-AP according to the available cluster offset bitmap of the first S-AP, the signal quality and the state, measured by the measurement module, of each Beacon SP included in the BI of the first S-AP, and the cluster information of the second S-AP that is received by the association module; and a joining module, configured to join a centralized cluster of the to-be-joined S-AP selected by the selection module.

In a first possible implementation manner of the third aspect, the cluster information of the first S-AP includes BI duration, cluster synchronization information, and clustering control information of the first S-AP, and an identity of a channel on which the first S-AP is located; and the measurement module includes:

a first determining unit, configured to determine, according to the cluster synchronization information, the BI duration, and the clustering control information of the first S-AP, a timing start moment of each Beacon SP included in the BI of the first S-AP; and a first measurement unit, configured to perform, on the channel corresponding to the identity of the channel on which the first S-AP is located and according to the timing start moment, determined by the first determining unit, of each Beacon SP included in the BI of the first S-AP, measurement on each Beacon SP included in the BI of the first S-AP, and obtain, by means of measurement, the signal quality and the state of each Beacon SP included in the BI of the first S-AP.

In a second possible implementation manner of the third aspect, the selection module further includes:

a second determining unit, configured to: if a ratio of a quantity of Beacon SPs whose signal quality exceeds a preset threshold to a quantity of Beacon SPs whose state is an occupied state is greater than a preset ratio, determine, according to the available cluster offset bitmap of the first S-AP and the signal quality and the state of each Beacon SP included in the BI of the first S-AP, whether to join a centralized cluster of the first S-AP; and a third determining unit, configured to: if the second determining unit determines to join the centralized cluster of the first S-AP, determine the first S-AP as the to-be-joined S-AP.

With reference to the second possible implementation manner of the third aspect, in a third possible implementation manner, the second determining unit includes:

a first forming subunit, configured to form a measured cluster offset bitmap of the first S-AP, where the measured cluster offset bitmap of the first S-AP is used to store the state, obtained by means of measurement, of each Beacon SP included in the BI of the first S-AP;

a first operation subunit, configured to perform an intersection operation on the Beacon SP that is included in the BI of the first S-AP, whose state is the idle state, and that is obtained by means of measurement, and a Beacon SP whose state stored in the available cluster offset bitmap of the first S-AP is an idle state; and perform a correlation operation on the measured cluster offset bitmap of the first S-AP and the available cluster offset bitmap of the first S-AP, so as to obtain a correlation of the measured cluster offset bitmap of the first S-AP; and a first determining subunit, configured to: if a result of the intersection operation is not null and the correlation of the measured cluster offset bitmap of the first S-AP is greater than a preset correlation threshold, determine to join the centralized cluster of the first S-AP; otherwise, determine not to join the centralized cluster of the first S-AP.

With reference to the second possible implementation manner of the third aspect, in a fourth possible implementation manner, the selection module further includes:

a second measurement unit, configured to: if it is determined not to join the centralized cluster of the first S-AP, measure, according to the cluster information of the second S-AP, signal quality and a state of each Beacon SP included in a BI of the second S-AP;

a calculation unit, configured to calculate a ratio of a quantity of Beacon SPs that are included in the BI of the second S-AP and whose signal quality measured by the second measurement unit exceeds the preset threshold to a quantity of Beacon SPs that are included in the BI of the second S-AP and whose state is an occupied state; and a selection unit, configured to select a second S-AP with a highest ratio, and determine the second S-AP with the highest ratio as the to-be-joined S-AP.

With reference to the fourth possible implementation manner of the third aspect, in a fifth possible implementation manner, the Announce frame further includes an available cluster offset bitmap of the second S-AP, and the available cluster offset bitmap of the second S-AP is used to store the state of each Beacon SP included in the BI of the second S-AP; and the selection unit includes:

a second forming subunit, configured to select the second S-AP with the highest ratio, and form a measured cluster offset bitmap of the second S-AP with the highest ratio, where the measured cluster offset bitmap of the second S-AP with the highest ratio is used to store a state, obtained by means of measurement, of each Beacon SP included in a BI of the second S-AP with the highest ratio;

a second operation subunit, configured to perform an intersection operation on a Beacon SP that is included in the BI of the second S-AP with the highest ratio and whose state is an idle state, and a Beacon SP whose state stored in an available cluster offset bitmap of the second S-AP with the highest ratio is an idle state; and perform a correlation operation on the measured cluster offset bitmap of the second S-AP with the highest ratio and the available cluster offset bitmap of the second S-AP with the highest ratio, so as to obtain a correlation of the measured cluster offset bitmap of the second S-AP with the highest ratio; and a second determining subunit, configured to: if a result of the intersection operation is not null and the correlation of the measured cluster offset bitmap of the second S-AP with the highest ratio is greater than a preset correlation threshold, determine to join a centralized cluster of the second S-AP with the highest ratio.

With reference to the fifth possible implementation manner of the third aspect, in a sixth possible implementation manner, the selection unit further includes:

a selection subunit, configured to: if the result of the intersection operation is null or the correlation of the measured cluster offset bitmap of the second S-AP with the highest ratio is less than or equal to the preset correlation threshold, select a second S-AP with a highest ratio from an unselected second S-AP.

With reference to the third aspect or any one of the first to the sixth possible implementation manners of the third aspect, in a seventh possible implementation manner, the channel group includes one first channel and two second channels, where a bandwidth resource occupied by the first channel is the same as that occupied by the two second channels, and the first channel overlaps the two second channels in frequency; and the joining module is further configured to: if the apparatus is a PCP/AP located on the second channel, receive cluster information, sent by the to-be-joined S-AP, of a new S-AP newly joining the first channel, measure, according to the cluster information of the new S-AP, signal quality and a state of each Beacon SP included in a BI of the new S-AP, and determine, according to the signal quality and the state of each Beacon SP included in the BI of the new S-AP, whether to join a centralized cluster of the new S-AP.

With reference to the third aspect or any one of the first to the seventh possible implementation manners of the third aspect, in an eighth possible implementation manner, the cluster information of the second S-AP includes BI duration, cluster synchronization information, and clustering control information of the second S-AP, and an identity of a channel on which the second S-AP is located;

the Announce frame includes an extended cluster report information element IE of the second S-AP, where the extended cluster report IE includes a reported BI duration field, a next beacon transmission interval BTI offset field, a clustering control report field, and a cluster channel number field; and the reported BI duration field is used to carry the BI duration of the second S-AP, the next BTI offset field is used to carry the cluster synchronization information of the second S-AP, the clustering control report field is used to carry the clustering control information of the second S-AP, and the cluster channel number field is used to carry the identity of the channel on which the second S-AP is located.

With reference to the eighth possible implementation manner of the third aspect, in a ninth possible implementation manner, the Announce frame further includes the available cluster offset bitmap of the second S-AP, and the extended cluster report IE further includes an available cluster offset bitmap field, where the available cluster offset bitmap field is used to carry the available cluster offset bitmap of the second S-AP.

According to a fourth aspect, an apparatus for joining a centralized cluster is provided, where the apparatus includes:

a sending module, configured to send a directional multi-gigabit beacon frame DMG Beacon frame to a personal basic service set control point/access point PCP/AP, where the DMG Beacon frame includes cluster information of a first synchronization access point S-AP, so that the PCP/AP measures, according to the cluster information of the first S-AP, signal quality and a state of each beacon scheduled service period Beacon SP included in a beacon interval BI of the first S-AP; and an association module, configured to: if a Beacon SP whose state is an idle state is obtained by means of measurement by the PCP/AP, associate the Beacon SP with the PCP/AP, and send an announce frame to the PCP/AP, where the Announce frame includes cluster information of a second S-AP and an available cluster offset bitmap of the first S-AP, the second S-AP is another S-AP, except the first S-AP, on each channel in a channel group in which the first S-AP is located, and the available cluster offset bitmap of the first S-AP is used to store the state of each Beacon SP included in the BI of the first S-AP, so that the PCP/AP selects one S-AP from the first S-AP and the second S-AP as a to-be-joined S-AP according to the available cluster offset bitmap of the first S-AP, the signal quality and the state of each Beacon SP included in the BI of the first S-AP, and the cluster information of the second S-AP, and joins a centralized cluster of the to-be-joined S-AP.

In a first possible implementation manner of the fourth aspect, the channel group includes one first channel and two second channels, where a bandwidth resource occupied by the first channel is the same as that occupied by the two second channels, and the first channel overlaps the two second channels in frequency; and the apparatus further includes:

a receiving module, configured to receive cluster information, sent by a centralized coordination service root CCSR, of a new S-AP newly joining the first channel, and broadcast, by using an extended cluster report information element IE, the cluster information of the new S-AP to all PCP/APs included in a centralized cluster of the first S-AP, so that a PCP/AP located on the second channel determines, according to the cluster information of the new S-AP, whether to join a centralized cluster of the new S-AP.

With reference to the first possible implementation manner of the fourth aspect, in a second possible implementation manner, the receiving module is configured to receive the cluster information, sent by the CCSR, of the new S-AP newly joining the first channel, and broadcast an Announce frame or a DMG Beacon frame to all the PCP/APs included in the centralized cluster of the first S-AP, where the Announce frame or the DMG Beacon frame includes the extended cluster report IE, and the extended cluster report IE includes the cluster information of the new S-AP.

With reference to the first possible implementation manner of the fourth aspect, in a third possible implementation manner, the apparatus further includes:

a broadcasting module, configured to: if it is determined to join the centralized cluster of the new S-AP, broadcast, by using a DMG Beacon frame or an Announce frame, a cluster switching announcement IE to all the PCP/APs included in the centralized cluster of the first S-AP, so as to broadcast a cluster switching decision of the first S-AP to all the PCP/APs included in the centralized cluster of the first S-AP.

With reference to the first possible implementation manner of the fourth aspect, in a fourth possible implementation manner, the apparatus further includes:

a determining module, configured to: if the first S-AP is located on the second channel, measure, according to the cluster information of the new S-AP, signal quality and a state of each Beacon SP included in a BI of the new S-AP, and determine, according to the signal quality and the state of each Beacon SP included in the BI of the new S-AP, whether to join the centralized cluster of the new S-AP.

According to a fifth aspect, an apparatus for joining a centralized cluster is provided, where the apparatus includes:

a first memory and a first processor, configured to perform the method for joining a centralized cluster according to the first aspect or any one of the first to the ninth possible implementation manners of the first aspect.

According to a sixth aspect, an apparatus for joining a centralized cluster is provided, where the apparatus includes:

a second memory and a second processor, configured to perform the method for joining a centralized cluster according to the second aspect or any one of the first to the fourth possible implementation manners of the second aspect.

According to the embodiments of the present invention, a PCP/AP receives an Announce frame sent by a first S-AP, where the Announce frame includes cluster information of a second S-AP and an available cluster offset bitmap of the first S-AP; selects one S-AP from the first S-AP and the second S-AP as a to-be-joined S-AP according to the available cluster offset bitmap of the first S-AP, signal quality and a state of each Beacon SP included in a BI of the first S-AP, and the cluster information of the second S-AP; and joins a centralized cluster of the to-be-joined S-AP, thereby implementing joining a centralized cluster. In addition, because the to-be-joined S-AP is selected according to the available cluster offset bitmap of the first S-AP, the signal quality and the state of each Beacon SP included in the BI of the first S-AP, and the cluster information of the second S-AP, stability of a joined centralized cluster is improved.

DESCRIPTION OF EMBODIMENTS

To make the objectives, technical solutions, and advantages of the present invention clearer, the following describes the embodiments of the present invention in further detail with reference to the accompanying drawings.

Figure 1:
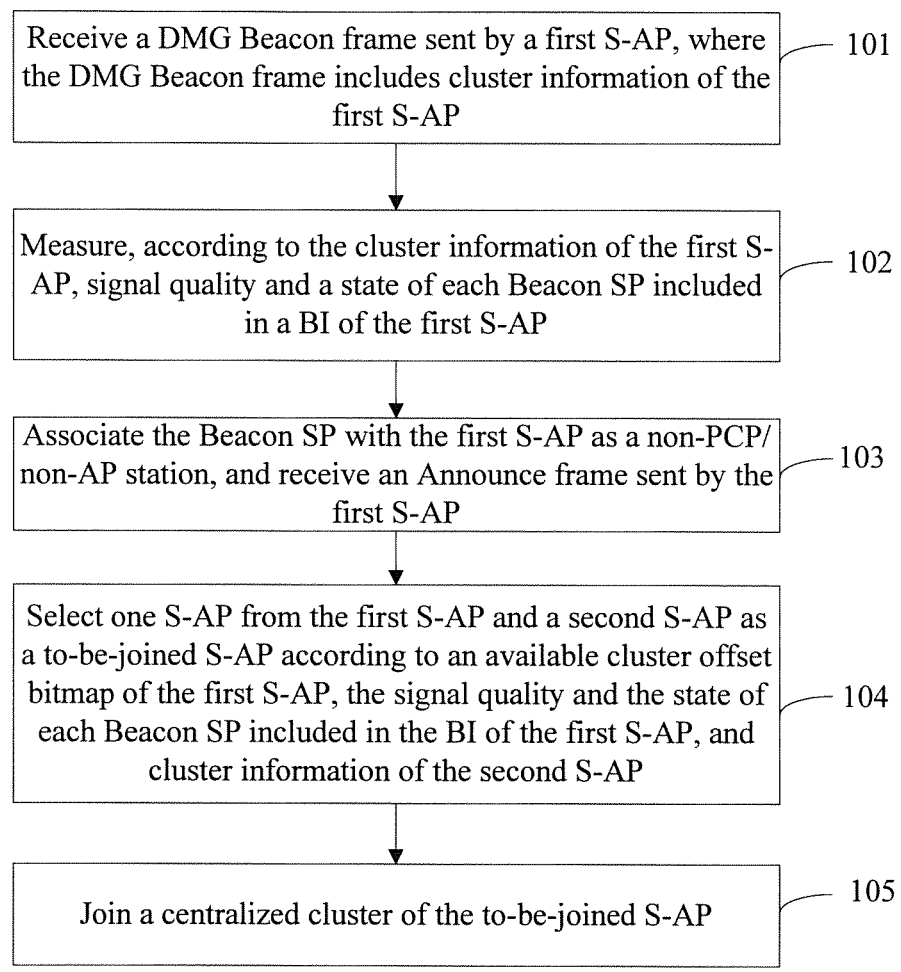
FIG. 1 is a flowchart of a method for joining a centralized cluster according to an embodiment of the present invention.

Referring to FIG. 1, an embodiment of the present invention provides a method for joining a centralized cluster, including the following steps:

Step 101: Receive a DMG Beacon (Directional Multi-Gigabit Beacon, directional multi-gigabit beacon) frame sent by a first S-AP, where the DMG Beacon frame includes cluster information of the first S-AP.

Step 102: Measure, according to the cluster information of the first S-AP, signal quality and a state of each Beacon SP included in a BI of the first S-AP.

Step 103: If a Beacon SP whose state is an idle state is obtained by means of measurement, associate the Beacon SP with the first S-AP as a non-PCP/non-AP station, and receive an Announce frame sent by the first S-AP, where the Announce frame includes cluster information of a second S-AP and an available cluster offset bitmap of the first S-AP, the second S-AP is another S-AP, except the first S-AP, on each channel in a channel group in which the first S-AP is located, and the available cluster offset bitmap of the first S-AP is used to store the state of each Beacon SP included in the BI of the first S-AP.

Step 104: Select one S-AP from the first S-AP and the second S-AP as a to-be-joined S-AP according to the available cluster offset bitmap of the first S-AP, the signal quality and the state of each Beacon SP included in the BI of the first S-AP, and the cluster information of the second S-AP.

Step 105: Join a centralized cluster of the to-be-joined S-AP.

According to this embodiment of the present invention, a PCP/AP receives an Announce frame sent by a first S-AP, where the Announce frame includes cluster information of a second S-AP and an available cluster offset bitmap of the first S-AP; selects one S-AP from the first S-AP and the second S-AP as a to-be-joined S-AP according to the available cluster offset bitmap of the first S-AP, signal quality and a state of each Beacon SP included in a BI of the first S-AP, and the cluster information of the second S-AP; and joins a centralized cluster of the to-be-joined S-AP, thereby implementing joining a centralized cluster. In addition, because the to-be-joined S-AP is selected according to the available cluster offset bitmap of the first S-AP, the signal quality and the state of each Beacon SP included in the BI of the first S-AP, and the cluster information of the second S-AP, stability of a joined centralized cluster is improved.

Figure 2:
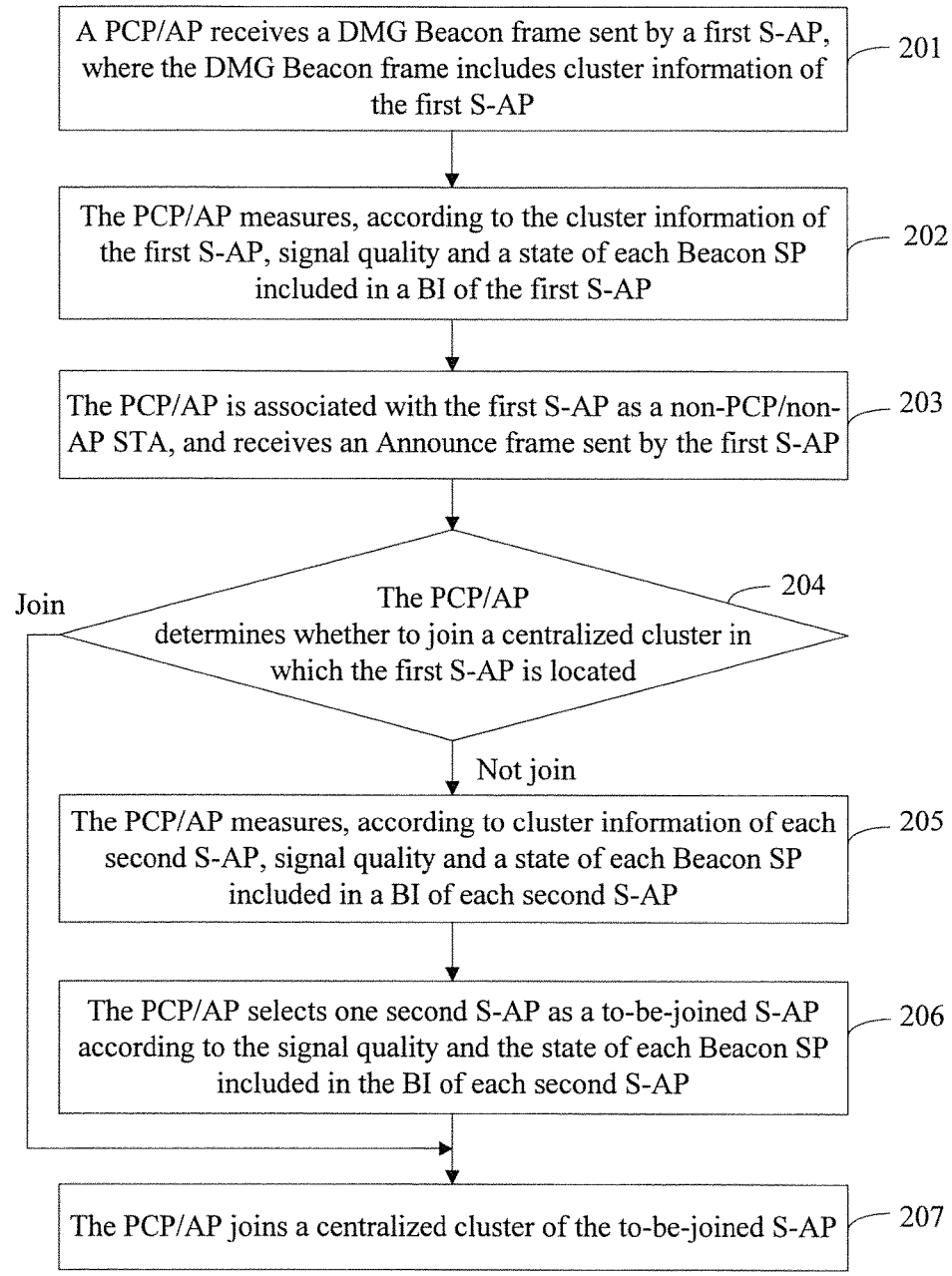
FIG. 2 is a flowchart of another method for joining a centralized cluster according to an embodiment of the present invention.

Referring to FIG. 2, an embodiment of the present invention provides a method for joining a centralized cluster, including the following steps:

Step 201: A PCP/AP receives a DMG Beacon frame sent by a first S-AP, where the DMG Beacon frame includes cluster information of the first S-AP, and the cluster information of the first S-AP includes BI (Beacon Interval, beacon interval) duration, cluster synchronization information, and clustering control information of the first S-AP, and an identity of a channel on which the first S-AP is located.

The clustering control information of the first S-AP includes a cluster identity, a cluster member role, a maximum quantity of cluster members allowed to join a centralized PCP/AP cluster of the first S-AP, and Beacon SP (Beacon Scheduled Service Period, beacon scheduled service period) duration. The PCP/AP and the first S-AP are located on a same channel.

A centralized cluster of the first S-AP includes the first S-AP and a group of cluster members, a cluster member is a PCP/AP, and the first S-AP provides a service for the cluster members included in the centralized cluster in which the first S-AP is located. A BI of the first S-AP includes multiple Beacon SPs, and a quantity of Beacon SPs included in the BI of the first S-AP is the same as the maximum quantity of cluster members allowed to join a centralized PCP/AP cluster of the first S-AP, where the first S-AP and the cluster members included in the centralized cluster of the first S-AP are each corresponding to one Beacon SP, the first S-AP broadcasts, in a Beacon SP corresponding to the first S-AP, a DMG Beacon frame to the cluster members included in the centralized cluster of the first S-AP, and the cluster members broadcast the DMG Beacon frame in their respective corresponding Beacon SPs.

A state of the Beacon SP corresponding to the first S-AP and states of the Beacon SPs corresponding to the cluster members included in the centralized cluster of the first S-AP are an occupied state. Among the Beacon SPs included in the BI of the first S-AP, a state of another Beacon SP except the Beacon SP corresponding to the first S-AP and the Beacon SPs corresponding to the cluster members included in the centralized cluster of the first S-AP is an idle state. The occupied state indicates that a DMG Beacon frame of a cluster member can be successfully received within the Beacon SP; otherwise, the Beacon SP is in an idle state. The DMG Beacon frame of first S-AP includes an available cluster offset bitmap (Available Cluster Offset Bitmap) of the first S-AP, where the available cluster offset bitmap of the first S-AP is used to store a state of each Beacon SP included in the BI of the first S-AP.

Step 202: The PCP/AP measures, according to the cluster information of the first S-AP, signal quality and a state of each Beacon SP included in a BI of the first S-AP.

Specifically, the PCP/AP determines, according to the cluster synchronization information, the BI duration and the clustering control information of the first A-SP, a timing start moment of each Beacon SP included in the BI of the first S-AP; and performs, on the channel corresponding to the identity of the channel on which the first S-AP is located and according to the timing start moment of each Beacon SP included in the BI of the first S-AP, measurement on each Beacon SP included in the BI of the first S-AP, and obtains, by means of measurement, the signal quality and the state of each Beacon SP included in the BI of the first S-AP.

Further, according to a quantity of Beacon SPs that are included in the BI of the first S-AP and whose signal quality exceeds a preset threshold, and a quantity of Beacon SPs that are included in the BI of the first S-AP and whose state is an occupied state, the PCP/AP calculates a ratio of the quantity of Beacon SPs whose signal quality exceeds the preset threshold to the quantity of Beacon SPs whose state is the occupied state.

Signal quality of a Beacon SP whose state is an idle state is less than the preset threshold, and the signal quality of the Beacon SP whose state is the idle state is relatively low or is 0. Therefore, a Beacon SP whose signal quality exceeds the preset threshold is a Beacon SP whose state is an occupied state.

The PCP/AP can determine information such as a start time and an end time of each Beacon SP included in the BI of the first S-AP.

Preferably, that the PCP/AP performs, on the channel corresponding to the identity of the channel on which the first S-AP is located and according to the timing start moment of each Beacon SP included in the BI of the first S-AP, measurement on each Beacon SP included in the BI of the first S-AP, and obtains, by means of measurement, the signal quality and the state of each Beacon SP included in the BI of the first S-AP may be as follows:

The PCP/AP determines the corresponding channel according to the identity of the channel on which the first S-AP is located; determines a next BI of the first S-AP according to a start time of the DMG Beacon frame and synchronization information of the first S-AP; performs receiving on the determined channel at a timing start moment of each Beacon SP included in the next BI; if receiving, from the determined channel and in a Beacon SP, a DMG Beacon frame sent by the first S-AP or a cluster member included in the centralized cluster of the first S-AP, determines that a state of the Beacon SP is an occupied state; or if the PCP/AP does not receive, from the determined channel and in a Beacon SP, a DMG Beacon frame sent by the first S-AP or a cluster member included in the centralized cluster of the first S-AP, determines that a state of the Beacon SP is an idle state.

Step 203: If a Beacon SP that is included in the BI of the first S-AP and whose state is an idle state is obtained by means of measurement, the PCP/AP is associated with the first S-AP as a secondary non-PCP/non-AP STA, and receives an Announce (announce) frame sent by the first S-AP, where the Announce frame includes cluster information of a second S-AP and the available cluster offset bitmap of the first S-AP, and the second S-AP is another S-AP, except the first S-AP, on each channel in a channel group in which the first S-AP is located.

The cluster information of the second S-AP includes BI duration, cluster synchronization information, and clustering control information of the second S-AP, and an identity of a channel on which the second S-AP is located; and the Announce frame may further include an available cluster offset bitmap of the second S-AP, where the available cluster offset bitmap of the second S-AP is used to store a state of each Beacon SP included in a BI of the second S-AP.

Figures 3, 4:
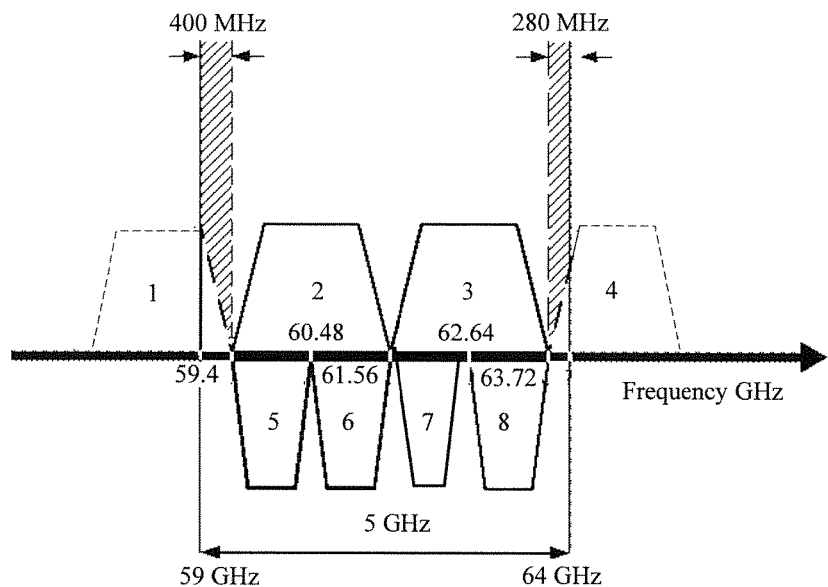
FIG. 3 is a schematic structural diagram of an extended cluster report IE according to an embodiment of the present invention.
FIG. 4 is a schematic structural diagram of a channel according to an embodiment of the present invention.

The Announce frame includes one extended cluster report IE (Information Element, information element) corresponding to each second S-AP, where the extended cluster report IE corresponding to the second S-AP is used to carry the cluster information of the second S-AP. Referring to FIG. 3, FIG. 3 is a schematic structural diagram of an extended cluster report IE, where the extended cluster report IE includes a reported BI duration (Reported BI duration) field, a next BTI (Beacon Transmission Interval, beacon transmission interval) offset (Next BTI Offset) field, a clustering control report (Clustering Control Report) field, and a cluster channel number (Cluster Channel number) field, where the reported BI duration field is used to carry the BI duration of the second S-AP, the next BTI offset field is used to carry the cluster synchronization information of the second S-AP, the clustering control report field is used to carry the clustering control information of the second S-AP, and the cluster channel number field is used to carry the identity of the channel on which the second S-AP is located.

Further, the Announce frame further includes the available cluster offset bitmap of the second S-AP, and the extended cluster report IE further includes an available cluster offset bitmap (Available Cluster Offset Bitmap) field, where the available cluster offset bitmap field is used to carry the available cluster offset bitmap of the second S-AP.

Further, the extended cluster report IE further includes an element ID (Identity, Identity) (Element ID) field, a duration field, and a request token (Request Token) field, where the element ID field is used to carry an identity of the extended cluster report IE, the duration field is used to carry length of the extended cluster report IE, and the request token field is set to 0 in a scenario of a centralized cluster.

The channel group in which the first S-AP is located includes one first channel and two second channels, where a bandwidth resource occupied by the first channel is the same as that occupied by the two second channels, and the first channel overlaps the two second channels in frequency. Sizes of bandwidth resources occupied by the two second channels are the same, and a sum of the sizes of the bandwidth resources occupied by the two second channels is equal to a size of the bandwidth resource occupied by the first channel. For example, referring to FIG. 4, a channel 3, a channel 7, and a channel 8 are located in a same channel group, where the channel 3 is a first channel, and the channel 7 and the channel 8 are second channels; and a size of a bandwidth resource occupied by the channel 3 is 2.16 GHz, and both sizes of bandwidth resources occupied by the channel 7 and the channel 8 are 1.08 GHz. In addition, the channel 3 occupies the bandwidth resource at a frequency from 61.56 GHz to 63.72 GHz, and a sum of the bandwidth resources occupied by the channel 7 and the channel 8 is equal to the bandwidth resource at the frequency from 61.56 GHz to 63.72 GHz. Therefore, the sizes of the bandwidth resources occupied by the channel 7 and the channel 8 are the same, and the sum of the sizes of the bandwidth resources occupied by the channel 7 and the channel 8 is equal to the size of the bandwidth resource occupied by the channel 3.

The first S-AP includes cluster information of S-APs on each channel in the channel group in which the first S-AP is located, and the cluster information of these S-APs is obtained when the first S-AP receives a periodical broadcast from a CCSR (Centralized Coordination Service Root, centralized coordination service root). For any S-AP in the channel group in which the first S-AP is located, when joining a channel in the channel group, the S-AP registers cluster information of the S-AP with the CCSR. The CCSR can manage each S-AP on each channel in the channel group; in addition, the CCSR can periodically broadcast cluster information of each S-AP on each channel in the channel group to each S-AP on each channel in the channel group.

Step 204: If a ratio of a quantity of Beacon SPs whose signal quality exceeds a preset threshold to a quantity of Beacon SPs whose state is an occupied state is greater than a preset ratio, the PCP/AP determines, according to the available cluster offset bitmap of the first S-AP and the signal quality and the state of each Beacon SP included in the BI of the first S-AP, whether to join a centralized cluster of the first S-AP, and if yes, performs step 207, or if no, performs step 205.

Specifically, the PCP/AP forms a measured cluster offset bitmap of the first S-AP, where the measured cluster offset bitmap of the first S-AP is used to store the state, obtained by means of measurement, of each Beacon SP included in the BI of the first S-AP; performs an intersection operation on the Beacon SP included in the BI of the first S-AP, whose state is the idle state, and that is obtained by means of measurement, and a Beacon SP whose state stored in the available cluster offset bitmap of the first S-AP is an idle state; and performs a correlation operation on the measured cluster offset bitmap of the first S-AP and the available cluster offset bitmap of the first S-AP, so as to obtain a correlation of the measured cluster offset bitmap of the first S-AP. If a result of the intersection operation is not null and the correlation of the measured cluster offset bitmap of the first S-AP is greater than a preset correlation threshold, the PCP/AP determines to join the centralized cluster of the first S-AP; otherwise, the PCP/AP determines not to join the centralized cluster of the first S-AP.

If the result of the intersection operation is not null, the result of the intersection operation includes a Beacon SP whose state is an idle state, and the state of the Beacon SP is the idle state in the measured cluster offset bitmap of the first S-AP and is the idle state in the available cluster offset bitmap of the first S-AP.

If the ratio of the quantity of Beacon SPs whose signal quality exceeds the preset threshold to the quantity of Beacon SPs whose state is the occupied state is less than or equal to the preset ratio, the operation ends.

Step 205: The PCP/AP measures, according to cluster information of each second S-AP, signal quality and a state of each Beacon SP included in a BI of each second S-AP.

Specifically, for any second S-AP, the PCP/AP determines, according to cluster synchronization information, BI duration, and clustering control information of the second A-SP, a timing start moment of each Beacon SP included in a BI of the second S-AP; and performs, on a channel corresponding to an identity of the channel on which the second S-AP is located and according to the timing start moment of each Beacon SP included in the BI of the second S-AP, measurement on each Beacon SP included in the BI of the second S-AP, and obtains, by means of measurement, signal quality and a state of each Beacon SP included in the BI of the second S-AP.

Step 206: The PCP/AP selects one second S-AP as a to-be-joined S-AP according to the signal quality and the state of each Beacon SP included in the BI of each second S-AP.

Specifically, this step may be implemented by using the following step 2061 to step 2065:

2061: Calculate a ratio of a quantity of Beacon SPs that are included in the BI of each second S-AP and whose signal quality exceeds the preset threshold to a quantity of Beacon SPs that are included in the BI of each second S-AP and whose state is an occupied state, so as to obtain a ratio corresponding to each second S-AP; and select a second S-AP with a highest ratio.

Specifically, for any second S-AP, a ratio of a quantity of Beacon SPs that are included in a BI of the second S-AP and whose signal quality exceeds the preset threshold to a quantity of Beacon SPs that are included in the BI of the second S-AP and whose state is an occupied state is calculated according to the quantity of Beacon SPs that are included in the BI of the second S-AP and whose signal quality exceeds the preset threshold and the quantity of Beacon SPs that are included in the BI of the second S-AP and whose state is the occupied state, so as to obtain a ratio corresponding to the second S-AP.

2062: Form a measured cluster offset bitmap of the second S-AP with the highest ratio, where the measured cluster offset bitmap of the second S-AP with the highest ratio is used to store a state, obtained by means of measurement, of each Beacon SP included in a BI of the second S-AP with the highest ratio.

2063: Perform an intersection operation on a Beacon SP that is included in the BI of the second S-AP with the highest ratio and whose state is an idle state, and a Beacon SP whose state stored in an available cluster offset bitmap of the second S-AP with the highest ratio is an idle state.

2064: Perform a correlation operation on the measured cluster offset bitmap of the second S-AP with the highest ratio and the available cluster offset bitmap of the second S-AP with the highest ratio, so as to obtain a correlation of the measured cluster offset bitmap of the second S-AP with the highest ratio.

2065: If a result of the intersection operation is not null and the correlation of the measured cluster offset bitmap of the second S-AP with the highest ratio is greater than a preset correlation threshold, determine to join a centralized cluster of the second S-AP with the highest ratio; otherwise, select a second S-AP with a highest ratio from an unselected second S-AP, and go back to step 2062.

Step 207: The PCP/AP joins a centralized cluster of the to-be-joined S-AP.

Specifically, the PCP/AP selects, from the Beacon SP that is included in the result of the intersection operation and whose state is the idle state, one Beacon SP as one Beacon SP corresponding to the PCP/AP; and sends, as a secondary non-PCP/non-AP STA and according to a cluster identity of the to-be-joined S-AP, an Information Response (information response) frame to the to-be-joined S-AP, where the Information Response frame carries an identity of the selected Beacon SP, so as to implement joining the centralized cluster of the to-be-joined S-AP.

After joining the centralized cluster of the to-be-joined S-AP, the PCP/AP determines, according to an identity of a channel on which the to-be-joined S-AP is located, the channel on which the to-be-joined S-AP is located. During a Beacon SP included in a BI of the to-be-joined S-AP, the PCP/AP receives, on the channel on which the to-be-joined S-AP is located, DMG Beacon frames sent by the to-be-joined S-AP and a cluster member included in the centralized cluster of the to-be-joined S-AP; or during the Beacon SP corresponding to the PCP/AP, the PCP/AP sends a DMG Beacon frame over the channel on which the to-be-joined S-AP is located.

Further, the to-be-joined S-AP broadcasts cluster information of all S-APs in a channel group to the cluster member included in the centralized cluster of the to-be-joined S-AP, and a broadcasting period is decided by the to-be-joined S-AP.

Preferably, when cluster information of an S-AP in the channel group changes, the S-AP having a change may send an Announce frame or an Information Response frame that carries changed cluster information to each PCP/AP included in a centralized cluster of the S-AP, that is, each cluster member, where the Announce frame or the Information Response frame includes an extended cluster report IE, and the extended cluster report IE carries the changed cluster information of the S-AP.

Preferably, for a cluster member PCP/AP included in any centralized cluster, if the PCP/AP cannot receive a DMG Beacon frame sent by an S-AP during consecutive BIs of which a quantity exceeds a preset quantity, cluster maintenance is enabled. Cluster information of all S-APs in a channel group that is recently received from the S-AP is used to monitor, within a preset time interval, signal quality and a state of a Beacon SP included in a BI of an S-AP on each channel in the channel group, so as to receive DMG Beacon frames sent by all other S-APs. If receiving DMG Beacon frames sent by one or more S-APs, according to the foregoing method for joining a centralized cluster, that is, according to step 201 to step 207 in the foregoing, the PCP/AP needs to select one S-AP and join a centralized cluster of the selected S-AP as a cluster member.

In order that an S-AP that can run only on a first channel is compatible and that centralized clusters that are on different channels and interfere with each other can be converged, once a new S-AP joins the first channel and registers with a CCSR, the CCSR needs to immediately provide, for an S-AP located on a second channel in a channel group, cluster information of the new S-AP newly joining the first channel; then the S-AP located on the second channel broadcasts the foregoing cluster information of the new S-AP to a cluster member of the S-AP located on the second channel by using an extended cluster report IE, so that an S-AP that is located on the second channel and is close to the new S-AP located on the first channel attempts to join a centralized cluster of the new S-AP, so as to quickly complete cluster convergence.

Figure 5:
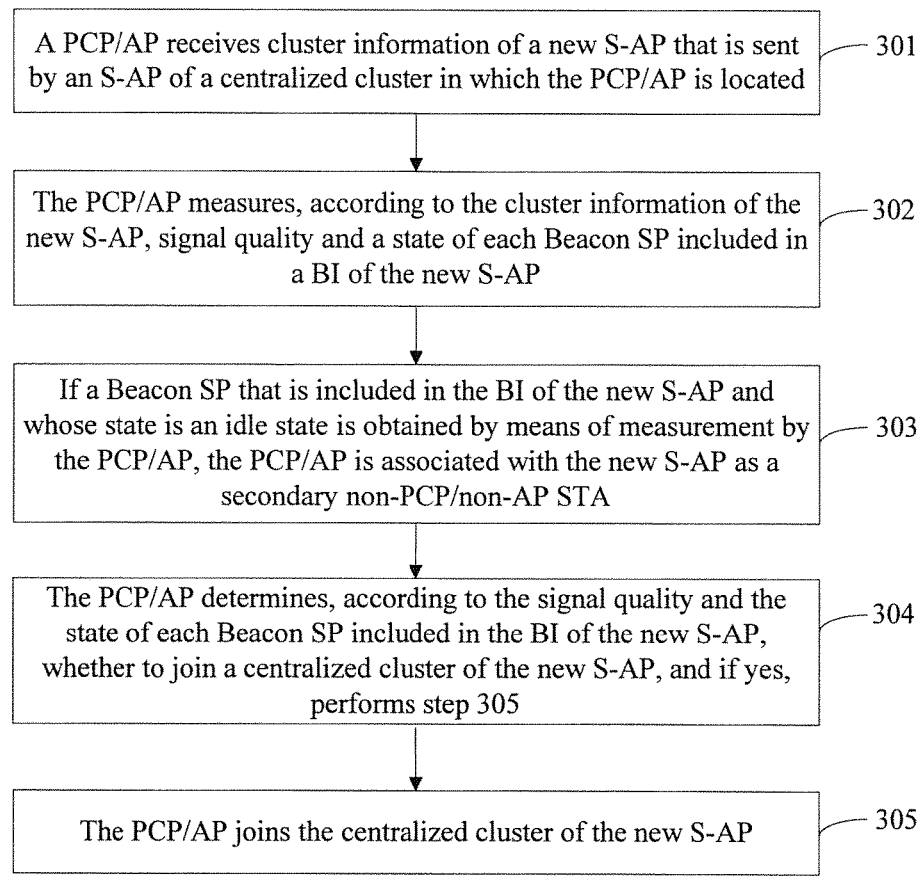
FIG. 5 is a flowchart of another method for joining a centralized cluster according to an embodiment of the present invention.

Referring to FIG. 5, when a new S-AP joins a first channel, and after the new S-AP registers cluster identity information of the new S-AP with a CCSR, a PCP/AP located on a second channel may attempt to join a centralized cluster of the new S-AP according to the following step 301 to step 305:

Step 301: The PCP/AP receives cluster information of the new S-AP that is sent by an S-AP in a centralized cluster in which the PCP/AP is located, where the cluster information of the new S-AP includes BI duration, cluster synchronization information, and clustering control information of the new S-AP, and an identity of a channel on which the new S-AP is located.

Further, when the new S-AP joins a first channel, and after the new S-AP registers the cluster identity information of the new S-AP to the CCSR, the CCSR broadcasts the cluster information of the new S-AP to an S-AP on each channel in a channel group. An S-AP receives the cluster information of the new S-AP, uses a DMG Beacon frame or an Announce frame to send an extended cluster report IE to a cluster member PCP/AP included in a centralized cluster of the S-AP, where the DMG Beacon frame or the Announce frame includes the extended cluster report IE, and the extended cluster report IE carries the cluster information of the new S-AP.

The Announce frame or the DMG Beacon frame is sent to all PCP/APs included in the centralized cluster of the first S-AP, where the Announce frame or the DMG Beacon frame includes the extended cluster report IE, and the extended cluster report IE includes the cluster information of the new S-AP.

Step 302: The PCP/AP measures, according to the cluster information of the new S-AP, signal quality and a state of each Beacon SP included in a BI of the new S-AP.

Specifically, the PCP/AP determines, according to the cluster synchronization information, the BI duration, and the clustering control information of the new S-AP, a timing start moment of each Beacon SP included in the BI of the new S-AP; and performs, on the channel corresponding to the identity of the channel on which the new S-AP is located and according to the cluster synchronization information of the new S-AP, measurement on each Beacon SP included in the BI of the new S-AP, and obtains, by means of measurement, the signal quality and the state of each Beacon SP included in the BI of the new S-AP.

Further, according to a quantity of Beacon SPs that are included in the BI of the new S-AP and whose signal quality exceeds a preset threshold, and a quantity of Beacon SPs that are included in the BI of the new S-AP and whose state is an occupied state, the PCP/AP calculates a ratio of the quantity of Beacon SPs whose signal quality exceeds the preset threshold to the quantity of Beacon SPs whose state is the occupied state.

Step 303: If a Beacon SP that is included in the BI of the new S-AP and whose state is an idle state is obtained by means of measurement by the PCP/AP, the PCP/AP is associated with the new S-AP as a secondary non-PCP/non/AP STA.

Step 304: The PCP/AP determines, according to the signal quality and the state of each Beacon SP included in the BI of the new S-AP, whether to join a centralized cluster of the new S-AP, and if the PCP/AP joins the centralized cluster of the new S-AP, performs step 305.

Specifically, if the ratio of the quantity of Beacon SPs whose signal quality exceeds the preset threshold to the quantity of Beacon SPs whose state is the occupied state is greater than a preset ratio, the PCP/AP forms a measured cluster offset bitmap of the new S-AP, where the measured cluster offset bitmap of the new S-AP is used to store the state, obtained by means of measurement, of each Beacon SP included in the BI of the new S-AP; performs an intersection operation on the Beacon SP that is included in the BI of the new S-AP, whose state is the idle state, and that is obtained by means of measurement, and a Beacon SP whose state stored in an available cluster offset bitmap of the new S-AP is an idle state; performs a correlation operation on the measured cluster offset bitmap of the new S-AP and the available cluster offset bitmap of the new S-AP, so as to obtain a correlation of the measured cluster offset bitmap of the new S-AP. If a result of the intersection operation is not null and the correlation of the measured cluster offset bitmap of the new S-AP is greater than a preset correlation threshold, the PCP/AP determines to join the centralized cluster of the new S-AP; otherwise, the PCP/AP determines not to join the centralized cluster of the new S-AP.

If the result of the intersection operation is not null, the result of the intersection operation includes a Beacon SP whose state is an idle state, and the state of the Beacon SP is the idle state in the measured cluster offset bitmap of the new S-AP and is the idle state in the available cluster offset bitmap of the new S-AP.

Step 305: The PCP/AP joins the centralized cluster of the new S-AP.

Specifically, the PCP/AP selects, from the Beacon SP that is included in the result of the intersection operation and whose state is the idle state, one Beacon SP as one Beacon SP corresponding to the PCP/AP; and sends, as a secondary non-PCP/non-AP and according to a cluster identity of the new S-AP, an Information Response frame to the new S-AP, where the Information Response frame carries an identity of the selected Beacon SP, so as to implement joining the centralized cluster of the new S-AP.

Further, after joining the centralized cluster of the new S-AP, the PCP/AP sends a cluster switching announcement IE to an original S-AP and a cluster member PCP/AP included in a centralized cluster of the original S-AP, so as to instruct the original S-AP and the cluster member PCP/AP included in the centralized cluster of the original S-AP to leave the centralized cluster.

Figure 6:
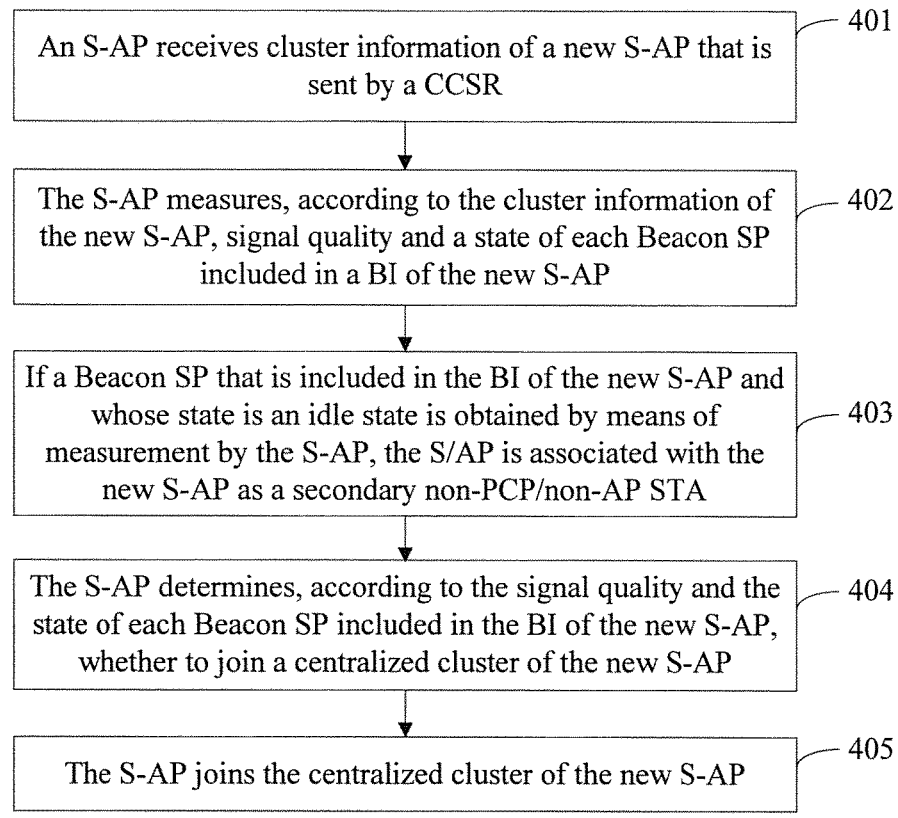
FIG. 6 is a flowchart of another method for joining a centralized cluster according to an embodiment of the present invention.

When receiving cluster information of a new S-AP that is sent by a CCSR, an S-AP may attempt to join a centralized cluster of the new S-AP according to a procedure of the following step 401 to step 405. Referring to FIG. 6, the procedure includes the following steps:

Step 401: The S-AP receives the cluster information of the new S-AP that is sent by the CCSR, where the cluster information of the new S-AP includes BI duration, cluster synchronization information, and clustering control information of the new S-AP, and an identity of a channel on which the new S-AP is located.

Step 402: The S-AP measures, according to the cluster information of the new S-AP, signal quality and a state of each Beacon SP included in a BI of the new S-AP.

Specifically, the S-AP determines, according to the BI duration and the clustering control information of the new S-AP, each Beacon SP included the BI of the new S-AP; and performs, on the channel corresponding to the identity of the channel on which the new S-AP is located and according to the cluster synchronization information of the new S-AP, measurement on each Beacon SP included in the BI of the new S-AP, and obtains, by means of measurement, the signal quality and the state of each Beacon SP included in the BI of the new S-AP.

Further, according to a quantity of Beacon SPs that are included in the BI of the new S-AP and whose signal quality exceeds a preset threshold, and a quantity of Beacon SPs that are included in the BI of the new S-AP and whose state is an occupied state, the S-AP calculates a ratio of the quantity of Beacon SPs whose signal quality exceeds the preset threshold to the quantity of Beacon SPs whose state is the occupied state.

Step 403: If a Beacon SP that is included in the BI of the new S-AP and whose state is an idle state is obtained by means of measurement by the S-AP, the S/AP is associated with the new S-AP as a secondary non-PCP/non-AP STA.

Step 404: The S-AP determines, according to the signal quality and the state of each Beacon SP included in the BI of the new S-AP, whether to join a centralized cluster of the new S-AP.

Specifically, if the ratio of the quantity of Beacon SPs whose signal quality exceeds the preset threshold to the quantity of Beacon SPs whose state is the occupied state is greater than a preset ratio, the S-AP forms a measured cluster offset bitmap of the new S-AP, where the measured cluster offset bitmap of the new S-AP is used to store the state, obtained by means of measurement, of each Beacon SP included in the BI of the new S-AP; performs an intersection operation on the Beacon SP that is included in the BI of the new S-AP, whose state is the idle state, and that is obtained by means of measurement, and a Beacon SP whose state stored in an available cluster offset bitmap of the new S-AP is an idle state; performs a correlation operation on the measured cluster offset bitmap of the new S-AP and the available cluster offset bitmap of the new S-AP, so as to obtain a correlation of the measured cluster offset bitmap of the new S-AP. If a result of the intersection operation is not null and the correlation of the measured cluster offset bitmap of the new S-AP is greater than a preset correlation threshold, the S-AP determines to join the centralized cluster of the new S-AP; otherwise, the S-AP determines not to join the centralized cluster of the new S-AP.

If the result of the intersection operation is not null, the result of the intersection operation includes a Beacon SP whose state is an idle state, and the state of the Beacon SP is the idle state in a first cluster offset bitmap of the new S-AP and is the idle state in the available cluster offset bitmap of the new S-AP.

Step 405: The S-AP joins the centralized cluster of the new S-AP.

Specifically, the S-AP selects, from the Beacon SP that is included in the result of the intersection operation and whose state is the idle state, one Beacon SP as one Beacon SP corresponding to the S-AP; and sends, as a secondary non-PCP/non-AP and according to a cluster identity of the new S-AP, an Information Response frame to the new S-AP, where the Information Response frame carries an identity of the selected Beacon SP, so as to implement joining the centralized cluster of the new S-AP.

Further, if the S-AP determines to join the centralized cluster of the new S-AP, the S-AP broadcasts a cluster switching announcement IE to all PCP/APs included in a centralized cluster of the S-AP, so as to broadcast a cluster switching decision of the S-AP to all the PCP/APs included in the centralized cluster of the S-AP.

Further, after receiving the cluster switching announcement IE sent by the S-AP, a PCP/AP may select one S-AP according to a procedure shown in FIG. 2, and join a centralized cluster of the selected S-AP.

The method provided in this embodiment may be applied to an application scenario such as a scenario of a 60 GHz technology.

According to this embodiment of the present invention, a PCP/AP receives an Announce frame sent by a first S-AP, where the Announce frame includes cluster information of a second S-AP and an available cluster offset bitmap of the first S-AP; selects one S-AP from the first S-AP and the second S-AP as a to-be-joined S-AP according to the available cluster offset bitmap of the first S-AP, signal quality and a state of each Beacon SP included in a BI of the first S-AP, and the cluster information of the second S-AP; and joins a centralized cluster of the to-be-joined S-AP, thereby implementing joining a centralized cluster. In addition, because the to-be-joined S-AP is selected according to the available cluster offset bitmap of the first S-AP, the signal quality and the state of each Beacon SP included in the BI of the first S-AP, and the cluster information of the second S-AP, stability of a joined centralized cluster is improved.

Figure 7:
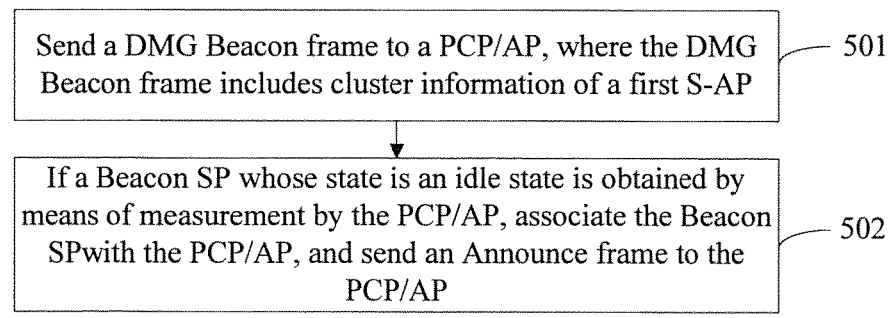
FIG. 7 is a flowchart of another method for joining a centralized cluster according to an embodiment of the present invention.

Referring to FIG. 7, an embodiment of the present invention provides a method for joining a centralized cluster, including the following steps:

Step 501: Send a DMG Beacon frame to a PCP/AP, where the DMG Beacon frame includes cluster information of a first S-AP, so that the PCP/AP measures, according to the cluster information of the first S-AP, signal quality and a state of each Beacon SP included in a BI of the first S-AP.

Step 502: If a Beacon SP whose state is an idle state is obtained by means of measurement by the PCP/AP, associate the Beacon SP with the PCP/AP, and send an Announce frame to the PCP/AP, where the Announce frame includes cluster information of a second S-AP and an available cluster offset bitmap of the first S-AP, the second S-AP is another S-AP, except the first S-AP, on each channel in a channel group in which the first S-AP is located, and the available cluster offset bitmap of the first S-AP is used to store the state of each Beacon SP included in the BI of the first S-AP, so that the PCP/AP selects one S-AP from the first S-AP and the second S-AP as a to-be-joined S-AP according to the available cluster offset bitmap of the first S-AP, the signal quality and the state of each Beacon SP included in the BI of the first S-AP, and the cluster information of the second S-AP, and joins a centralized cluster of the to-be-joined S-AP.

According to this embodiment of the present invention, a first S-AP is associated with a PCP/AP, and sends an Announce frame to the PCP/AP, where the Announce frame includes cluster information of a second S-AP and an available cluster offset bitmap of the first S-AP, so that the PCP/AP selects one S-AP from the first S-AP and the second S-AP as a to-be-joined S-AP according to the available cluster offset bitmap of the first S-AP, signal quality and a state of each Beacon SP included in a BI of the first S-AP, and the cluster information of the second S-AP, and joins a centralized cluster of the to-be-joined S-AP, thereby implementing joining a centralized cluster. In addition, because the to-be-joined S-AP is selected according to the available cluster offset bitmap of the first S-AP, the signal quality and the state of each Beacon SP included in the BI of the first S-AP, and the cluster information of the second S-AP, stability of a joined centralized cluster is improved.

Figure 8:
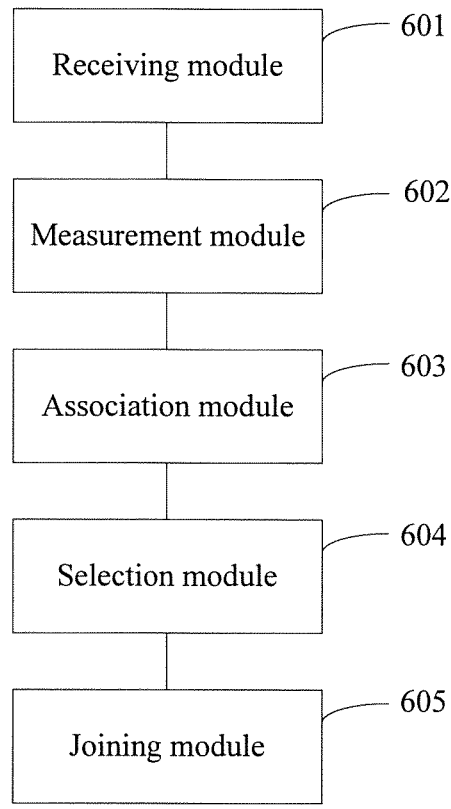
FIG. 8 is a schematic structural diagram of an apparatus for joining a centralized cluster according to an embodiment of the present invention.

Referring to FIG. 8, an embodiment of the present invention provides an apparatus for joining a centralized cluster, where the apparatus includes:

a receiving module 601, configured to receive a DMG Beacon frame sent by a first synchronization access point S-AP, where the DMG Beacon frame includes cluster information of the first S-AP;

a measurement module 602, configured to measure, according to the cluster information of the first S-AP that is received by the receiving module 601, signal quality and a state of each beacon scheduled service period Beacon SP included in a beacon interval BI of the first S-AP;

an association module 603, configured to: if a Beacon SP whose state is an idle state is obtained by means of measurement by the measurement module 602, associate the Beacon SP with the first S-AP as a non-personal basic service set control point PCP/non-access point AP station (STA), and receive an announce frame sent by the first S-AP, where the Announce frame includes cluster information of a second S-AP and an available cluster offset bitmap of the first S-AP, the second S-AP is another S-AP, except the first S-AP, on each channel in a channel group in which the first S-AP is located, and the available cluster offset bitmap of the first S-AP is used to store the state of each Beacon SP included in the BI of the first S-AP;

a selection module 604, configured to select one S-AP from the first S-AP and the second S-AP as a to-be-joined S-AP according to the available cluster offset bitmap of the first S-AP, the signal quality and the state, measured by the measurement module 602, of each Beacon SP included in the BI of the first S-AP, and the cluster information of the second S-AP that is received by the association module 603; and a joining module 605, configured to join a centralized cluster of the to-be-joined S-AP selected by the selection module 604.

Preferably, the cluster information of the first S-AP includes BI duration, cluster synchronization information, and clustering control information of the first S-AP, and an identity of a channel on which the first S-AP is located; and the measurement module 602 includes:

a first determining unit, configured to determine, according to the cluster synchronization information, the BI duration, and the clustering control information of the first S-AP, a timing start moment of each Beacon SP included in the BI of the first S-AP; and a first measurement unit, configured to perform, on the channel corresponding to the identity of the channel on which the first S-AP is located and according to the timing start moment, determined by the first determining unit, of each Beacon SP included in the BI of the first S-AP, measurement on each Beacon SP included in the BI of the first S-AP, and obtain, by means of measurement, the signal quality and the state of each Beacon SP included in the BI of the first S-AP.

Preferably, the selection module 604 includes:

a second determining unit, configured to: if a ratio of a quantity of Beacon SPs whose signal quality exceeds a preset threshold to a quantity of Beacon SPs whose state is an occupied state is greater than a preset ratio, determine, according to the available cluster offset bitmap of the first S-AP and the signal quality and the state of each Beacon SP included in the BI of the first S-AP, whether to join a centralized cluster of the first S-AP; and a third determining unit, configured to: if the second determining unit determines to join the centralized cluster of the first S-AP, determine the first S-AP as the to-be-joined S-AP.

Preferably, the second determining unit includes:

a first forming subunit, configured to form a measured cluster offset bitmap of the first S-AP, where the measured cluster offset bitmap of the first S-AP is used to store the state, obtained by means of measurement, of each Beacon SP included in the BI of the first S-AP;

a first operation subunit, configured to perform an intersection operation on the Beacon SP that is included in the BI of the first S-AP, whose state is the idle state, and that is obtained by means of measurement, and a Beacon SP whose state stored in the available cluster offset bitmap of the first S-AP is an idle state; and perform a correlation operation on the measured cluster offset bitmap of the first S-AP and the available cluster offset bitmap of the first S-AP, so as to obtain a correlation of the measured cluster offset bitmap of the first S-AP; and a first determining subunit, configured to: if a result of the intersection operation is not null and the correlation of the measured cluster offset bitmap of the first S-AP is greater than a preset correlation threshold, determine to join the centralized cluster of the first S-AP; otherwise, determine not to join the centralized cluster of the first S-AP.

Further, the selection module 604 further includes:

a second measurement unit, configured to: if it is determined not to join the centralized cluster of the first S-AP, measure, according to the cluster information of the second S-AP, signal quality and a state of each Beacon SP included in a BI of the second S-AP;

a calculation unit, configured to calculate a ratio of a quantity of Beacon SPs that are included in the BI of the second S-AP and whose signal quality measured by the second measurement unit exceeds the preset threshold to a quantity of Beacon SPs that are included in the BI of the second S-AP and whose state is an occupied state; and a selection unit, configured to select a second S-AP with a highest ratio, and determine the second S-AP with the highest ratio as the to-be-joined S-AP.

Further, the Announce frame further includes an available cluster offset bitmap of the second S-AP, and the available cluster offset bitmap of the second S-AP is used to store the state of each Beacon SP included in the BI of the second S-AP; and the selection unit includes:

a second forming subunit, configured to select the second S-AP with the highest ratio, and form a measured cluster offset bitmap of the second S-AP with the highest ratio, where the measured cluster offset bitmap of the second S-AP with the highest ratio is used to store a state, obtained by means of measurement, of each Beacon SP included in a BI of the second S-AP with the highest ratio;

a second operation subunit, configured to perform an intersection operation on a Beacon SP that is included in the BI of the second S-AP with the highest ratio and whose state is an idle state, and a Beacon SP whose state stored in an available cluster offset bitmap of the second S-AP with the highest ratio is an idle state; and perform a correlation operation on the measured cluster offset bitmap of the second S-AP with the highest ratio and the available cluster offset bitmap of the second S-AP with the highest ratio, so as to obtain a correlation of the measured cluster offset bitmap of the second S-AP with the highest ratio; and a second determining subunit, configured to: if a result of the intersection operation is not null and the correlation of the measured cluster offset bitmap of the second S-AP with the highest ratio is greater than a preset correlation threshold, determine to join a centralized cluster of the second S-AP with the highest ratio.

Further, the selection unit further includes:

a selection subunit, configured to: if the result of the intersection operation is null or the correlation of the measured cluster offset bitmap of the second S-AP with the highest ratio is less than or equal to the preset correlation threshold, select a second S-AP with a highest ratio from an unselected second S-AP.

Preferably, the channel group includes one first channel and two second channels, where a bandwidth resource occupied by the first channel is the same as that occupied by the two second channels, and the first channel overlaps the two second channels in frequency; and the joining module is further configured to: if the apparatus is a PCP/AP located on the second channel, receive cluster information, sent by the to-be-joined S-AP, of a new S-AP newly joining the first channel, measure, according to the cluster information of the new S-AP, signal quality and a state of each Beacon SP included in a BI of the new S-AP, and determine, according to the signal quality and the state of each Beacon SP included in the BI of the new S-AP, whether to join a centralized cluster of the new S-AP.

Preferably, the cluster information of the second S-AP includes BI duration, cluster synchronization information, and clustering control information of the second S-AP, and an identity of a channel on which the second S-AP is located;

the Announce frame includes an extended cluster report information element IE of the second S-AP, where the extended cluster report IE includes a reported BI duration field, a next beacon transmission interval BTI offset field, a clustering control report field, and a cluster channel number field; and the reported BI duration field is used to carry the BI duration of the second S-AP, the next BTI offset field is used to carry the cluster synchronization information of the second S-AP, the clustering control report field is used to carry the clustering control information of the second S-AP, and the cluster channel number field is used to carry the identity of the channel on which the second S-AP is located.

Further, the Announce frame further includes the available cluster offset bitmap of the second S-AP, and the extended cluster report IE further includes an available cluster offset bitmap field, where the available cluster offset bitmap field is used to carry the available cluster offset bitmap of the second S-AP.

According to this embodiment of the present invention, a PCP/AP receives an Announce frame sent by a first S-AP, where the Announce frame includes cluster information of a second S-AP and an available cluster offset bitmap of the first S-AP; selects one S-AP from the first S-AP and the second S-AP as a to-be-joined S-AP according to the available cluster offset bitmap of the first S-AP, signal quality and a state of each Beacon SP included in a BI of the first S-AP, and the cluster information of the second S-AP; and joins a centralized cluster of the to-be-joined S-AP, thereby implementing joining a centralized cluster. In addition, because the to-be-joined S-AP is selected according to the available cluster offset bitmap of the first S-AP, the signal quality and the state of each Beacon SP included in the BI of the first S-AP, and the cluster information of the second S-AP, stability of a joined centralized cluster is improved.

Figure 9:
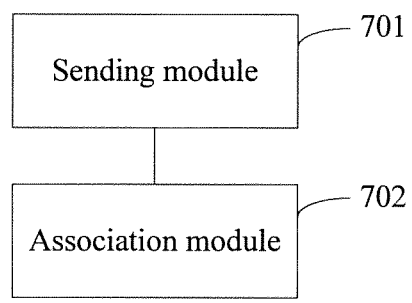
FIG. 9 is a schematic structural diagram of another apparatus for joining a centralized cluster according to an embodiment of the present invention.

Referring to FIG. 9, an embodiment of the present invention provides an apparatus for joining a centralized cluster, including:

a sending module 701, configured to send a DMG beacon frame Beacon frame to a personal basic service set control point/access point PCP/AP, where the DMG Beacon frame includes cluster information of a first synchronization access point S-AP, so that the PCP/AP measures, according to the cluster information of the first S-AP, signal quality and a state of each beacon scheduled service period Beacon SP included in a beacon interval BI of the first S-AP; and an association module 702, configured to: if a Beacon SP whose state is an idle state is obtained by means of measurement by the PCP/AP, associate the Beacon SP with the PCP/AP, and send an announce frame to the PCP/AP, where the Announce frame includes cluster information of a second S-AP and an available cluster offset bitmap of the first S-AP, the second S-AP is another S-AP, except the first S-AP, on each channel in a channel group in which the first S-AP is located, and the available cluster offset bitmap of the first S-AP is used to store the state of each Beacon SP included in the BI of the first S-AP, so that the PCP/AP selects one S-AP from the first S-AP and the second S-AP as a to-be-joined S-AP according to the available cluster offset bitmap of the first S-AP, the signal quality and the state of each Beacon SP included in the BI of the first S-AP, and the cluster information of the second S-AP, and joins a centralized cluster of the to-be-joined S-AP.

Preferably, the channel group includes one first channel and two second channels, where a bandwidth resource occupied by the first channel is the same as that occupied by the two second channels, and the first channel overlaps the two second channels in frequency; and the apparatus further includes:

a receiving module, configured to receive cluster information, sent by a centralized coordination service root CCSR, of a new S-AP newly joining the first channel, and broadcast, by using an extended cluster report information element IE, the cluster information of the new S-AP to all PCP/APs included in a centralized cluster of the first S-AP, so that a PCP/AP located on the second channel determines, according to the cluster information of the new S-AP, whether to join a centralized cluster of the new S-AP.

Preferably, the receiving module is configured to receive the cluster information, sent by the CCSR, of the new S-AP newly joining the first channel, and broadcast an Announce frame or a DMG Beacon frame to all the PCP/APs included in the centralized cluster of the first S-AP, where the Announce frame or the DMG Beacon frame includes the extended cluster report IE, and the extended cluster report IE includes the cluster information of the new S-AP.

Further, the apparatus further includes:

a broadcasting module, configured to: if it is determined to join the centralized cluster of the new S-AP, broadcast, by using a DMG Beacon frame or an Announce frame, a cluster switching announcement IE to all the PCP/APs included in the centralized cluster of the first S-AP, so as to broadcast a cluster switching decision of the first S-AP to all the PCP/APs included in the centralized cluster of the first S-AP.

Further, the apparatus further includes:

a determining module, configured to: if the first S-AP is located on the second channel, measure, according to the cluster information of the new S-AP, signal quality and a state of each Beacon SP included in a BI of the new S-AP, and determine, according to the signal quality and the state of each Beacon SP included in the BI of the new S-AP, whether to join the centralized cluster of the new S-AP.

According to this embodiment of the present invention, a first S-AP is associated with a PCP/AP, and sends an Announce frame to the PCP/AP, where the Announce frame includes cluster information of a second S-AP and an available cluster offset bitmap of the first S-AP, so that the PCP/AP selects one S-AP from the first S-AP and the second S-AP as a to-be-joined S-AP according to the available cluster offset bitmap of the first S-AP, signal quality and a state of each Beacon SP included in a BI of the first S-AP, and the cluster information of the second S-AP, and joins a centralized cluster of the to-be-joined S-AP, thereby implementing joining a centralized cluster. In addition, because the to-be-joined S-AP is selected according to the available cluster offset bitmap of the first S-AP, the signal quality and the state of each Beacon SP included in the BI of the first S-AP, and the cluster information of the second S-AP, stability of a joined centralized cluster is improved.

Figure 10:
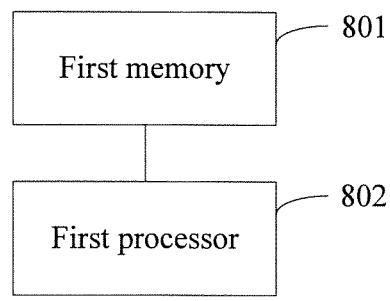
FIG. 10 is a schematic structural diagram of another apparatus for joining a centralized cluster according to an embodiment of the present invention.

Referring to FIG. 10, an embodiment of the present invention provides an apparatus for joining a centralized cluster, including:

a first memory 801 and a first processor 802, configured to perform the following method for joining a centralized cluster, where the method includes:

receiving a DMG Beacon frame sent by a first synchronization access point S-AP, where the DMG Beacon frame includes cluster information of the first S-AP;

measuring, according to the cluster information of the first S-AP, signal quality and a state of each beacon scheduled service period Beacon SP included in a beacon interval BI of the first S-AP;

if a Beacon SP whose state is an idle state is obtained by means of measurement, associating the Beacon SP with the first S-AP as a non-personal basic service set control point PCP/non-access point AP station (STA), and receiving an announce frame sent by the first S-AP, where the Announce frame includes cluster information of a second S-AP and an available cluster offset bitmap of the first S-AP, the second S-AP is another S-AP, except the first S-AP, on each channel in a channel group in which the first S-AP is located, and the available cluster offset bitmap of the first S-AP is used to store the state of each Beacon SP included in the BI of the first S-AP;

selecting one S-AP from the first S-AP and the second S-AP as a to-be-joined S-AP according to the available cluster offset bitmap of the first S-AP, the signal quality and the state of each Beacon SP included in the BI of the first S-AP, and the cluster information of the second S-AP; and joining a centralized cluster of the to-be-joined S-AP.

The cluster information of the first S-AP includes BI duration, cluster synchronization information, and clustering control information of the first S-AP, and an identity of a channel on which the first S-AP is located; and the measuring, according to the cluster information of the first S-AP, signal quality and a state of each beacon scheduled service period Beacon SP included in a beacon interval BI of the first S-AP includes:

determining, according to the cluster synchronization information, the BI duration, and the clustering control information of the first S-AP, a timing start moment of each Beacon SP included in the BI of the first S-AP; and performing, on the channel corresponding to the identity of the channel on which the first S-AP is located and according to the timing start moment of each Beacon SP included in the BI of the first S-AP, measurement on each Beacon SP included in the BI of the first S-AP, and obtaining, by means of measurement, the signal quality and the state of each Beacon SP included in the BI of the first S-AP.

The selecting one S-AP from the first S-AP and the second S-AP as a to-be-joined S-AP according to the available cluster offset bitmap of the first S-AP, the signal quality and the state of each Beacon SP included in the BI of the first S-AP, and the cluster information of the second S-AP includes:

if a ratio of a quantity of Beacon SPs whose signal quality exceeds a preset threshold to a quantity of Beacon SPs whose state is an occupied state is greater than a preset ratio, determining, according to the available cluster offset bitmap of the first S-AP and the signal quality and the state of each Beacon SP included in the BI of the first S-AP, whether to join a centralized cluster of the first S-AP; and if it is determined to join the centralized cluster of the first S-AP, determining the first S-AP as the to-be-joined S-AP.

Preferably, the determining, according to the available cluster offset bitmap of the first S-AP and the signal quality and the state of each Beacon SP included in the BI of the first S-AP, whether to join a centralized cluster of the first S-AP includes:

forming a measured cluster offset bitmap of the first S-AP, where the measured cluster offset bitmap of the first S-AP is used to store the state, obtained by means of measurement, of each Beacon SP included in the BI of the first S-AP;

performing an intersection operation on the Beacon SP that is included in the BI of the first S-AP, whose state is the idle state, and that is obtained by means of measurement, and a Beacon SP whose state stored in the available cluster offset bitmap of the first S-AP is an idle state;

performing a correlation operation on the measured cluster offset bitmap of the first S-AP and the available cluster offset bitmap of the first S-AP, so as to obtain a correlation of the measured cluster offset bitmap of the first S-AP; and if a result of the intersection operation is not null and the correlation of the measured cluster offset bitmap of the first S-AP is greater than a preset correlation threshold, determining to join the centralized cluster of the first S-AP; otherwise, determining not to join the centralized cluster of the first S-AP.

Further, the method further includes:

if it is determined not to join the centralized cluster of the first S-AP, measuring, according to the cluster information of the second S-AP, signal quality and a state of each Beacon SP included in a BI of the second S-AP;

calculating a ratio of a quantity of Beacon SPs that are included in the BI of the second S-AP and whose signal quality exceeds the preset threshold to a quantity of Beacon SPs that are included in the BI of the second S-AP and whose state is an occupied state; and selecting a second S-AP with a highest ratio, and determining the second S-AP with the highest ratio as the to-be-joined S-AP.

Further, the Announce frame further includes an available cluster offset bitmap of the second S-AP, where the available cluster offset bitmap of the second S-AP is used to store the state of each Beacon SP included in the BI of the second S-AP; and the determining the second S-AP with the highest ratio as the to-be-joined S-AP includes:

forming a measured cluster offset bitmap of the second S-AP with the highest ratio, where the measured cluster offset bitmap of the second S-AP with the highest ratio is used to store a state, obtained by means of measurement, of each Beacon SP included in a BI of the second S-AP with the highest ratio;

performing an intersection operation on a Beacon SP that is included in the BI of the second S-AP with the highest ratio and whose state is an idle state, and a Beacon SP whose state stored in an available cluster offset bitmap of the second S-AP with the highest ratio is an idle state;

performing a correlation operation on the measured cluster offset bitmap of the second S-AP with the highest ratio and the available cluster offset bitmap of the second S-AP with the highest ratio, so as to obtain a correlation of the measured cluster offset bitmap of the second S-AP with the highest ratio; and if a result of the intersection operation is not null and the correlation of the measured cluster offset bitmap of the second S-AP with the highest ratio is greater than a preset correlation threshold, determining to join a centralized cluster of the second S-AP with the highest ratio.

Further, the method further includes:

if the result of the intersection operation is null or the correlation of the measured cluster offset bitmap of the second S-AP with the highest ratio is less than or equal to the preset correlation threshold, selecting a second S-AP with a highest ratio from an unselected second S-AP.

The channel group includes one first channel and two second channels, where a bandwidth resource occupied by the first channel is the same as that occupied by the two second channels, and the first channel overlaps the two second channels in frequency; and if the apparatus is a PCP/AP located on the second channel, after the joining a centralized cluster of the to-be-joined S-AP, the method further includes:

receiving cluster information, sent by the to-be-joined S-AP, of a new S-AP newly joining the first channel, measuring, according to the cluster information of the new S-AP, signal quality and a state of each Beacon SP included in a BI of the new S-AP, and determining, according to the signal quality and the state of each Beacon SP included in the BI of the new S-AP, whether to join a centralized cluster of the new S-AP.

The cluster information of the second S-AP includes BI duration, cluster synchronization information, and clustering control information of the second S-AP, and an identity of a channel on which the second S-AP is located;

the Announce frame includes an extended cluster report information element IE of the second S-AP, where the extended cluster report IE includes a reported BI duration field, a next beacon transmission interval BTI offset field, a clustering control report field, and a cluster channel number field; and the reported BI duration field is used to carry the BI duration of the second S-AP, the next BTI offset field is used to carry the cluster synchronization information of the second S-AP, the clustering control report field is used to carry the clustering control information of the second S-AP, and the cluster channel number field is used to carry the identity of the channel on which the second S-AP is located.

Further, the Announce frame further includes the available cluster offset bitmap of the second S-AP, and the extended cluster report IE further includes an available cluster offset bitmap field, where the available cluster offset bitmap field is used to carry the available cluster offset bitmap of the second S-AP.

According to this embodiment of the present invention, a PCP/AP receives an Announce frame sent by a first S-AP, where the Announce frame includes cluster information of a second S-AP and an available cluster offset bitmap of the first S-AP; selects one S-AP from the first S-AP and the second S-AP as a to-be-joined S-AP according to the available cluster offset bitmap of the first S-AP, signal quality and a state of each Beacon SP included in a BI of the first S-AP, and the cluster information of the second S-AP; and joins a centralized cluster of the to-be-joined S-AP, thereby implementing joining a centralized cluster. In addition, because the to-be-joined S-AP is selected according to the available cluster offset bitmap of the first S-AP, the signal quality and the state of each Beacon SP included in the BI of the first S-AP, and the cluster information of the second S-AP, stability of a joined centralized cluster is improved.

Figure 11:
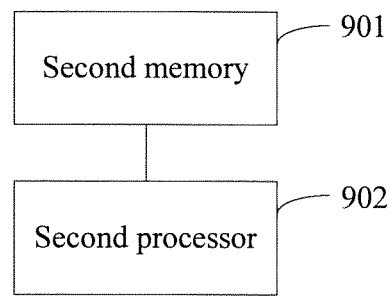
FIG. 11 is a schematic structural diagram of another apparatus for joining a centralized cluster according to an embodiment of the present invention.

Referring to FIG. 11, an embodiment of the present invention provides an apparatus for joining a centralized cluster, including:

a second memory 901 and a second processor 902, configured to perform the following method for joining a centralized cluster, where the method includes:

sending a DMG Beacon frame to a personal basic service set control point/access point PCP/AP, where the DMG Beacon frame includes cluster information of a first synchronization access point S-AP, so that the PCP/AP measures, according to the cluster information of the first S-AP, signal quality and a state of each beacon scheduled service period Beacon SP included in a beacon interval BI of the first S-AP; and if a Beacon SP whose state is an idle state is obtained by means of measurement by the PCP/AP, associating the Beacon SP with the PCP/AP, and sending an announce frame to the PCP/AP, where the Announce frame includes cluster information of a second S-AP and an available cluster offset bitmap of the first S-AP, the second S-AP is another S-AP, except the first S-AP, on each channel in a channel group in which the first S-AP is located, and the available cluster offset bitmap of the first S-AP is used to store the state of each Beacon SP included in the BI of the first S-AP, so that the PCP/AP selects one S-AP from the first S-AP and the second S-AP as a to-be-joined S-AP according to the available cluster offset bitmap of the first S-AP, the signal quality and the state of each Beacon SP included in the BI of the first S-AP, and the cluster information of the second S-AP, and joins a centralized cluster of the to-be-joined S-AP.

The channel group includes one first channel and two second channels, where a bandwidth resource occupied by the first channel is the same as that occupied by the two second channels, and the first channel overlaps the two second channels in frequency; and the method further includes:

receiving cluster information, sent by a centralized coordination service root CCSR, of a new S-AP newly joining the first channel, and broadcasting, by using an extended cluster report information element IE, the cluster information of the new S-AP to all PCP/APs included in a centralized cluster of the first S-AP, so that a PCP/AP located on the second channel determines, according to the cluster information of the new S-AP, whether to join a centralized cluster of the new S-AP.

Preferably, the broadcasting, by using an extended cluster report information element IE, the cluster information of the new S-AP to all PCP/APs included in a centralized cluster of the first S-AP includes:

broadcasting an Announce frame or a DMG Beacon frame to all the PCP/APs included in the centralized cluster of the first S-AP, where the Announce frame or the DMG Beacon frame includes the extended cluster report IE, and the extended cluster report IE includes the cluster information of the new S-AP.

Further, the method further includes:

if it is determined to join the centralized cluster of the new S-AP, broadcasting, by using a DMG Beacon frame or an Announce frame, a cluster switching announcement IE to all the PCP/APs included in the centralized cluster of the first S-AP, so as to broadcast a cluster switching decision of the first S-AP to all the PCP/APs included in the centralized cluster of the first S-AP.

Further, after the receiving cluster information, sent by a centralized coordination service root CCSR, of a new S-AP newly joining the first channel, the method further includes:

if the first S-AP is located on the second channel, measuring, according to the cluster information of the new S-AP, signal quality and a state of each Beacon SP included in a BI of the new S-AP, and determining, according to the signal quality and the state of each Beacon SP included in the BI of the new S-AP, whether to join the centralized cluster of the new S-AP.

According to this embodiment of the present invention, a first S-AP is associated with a PCP/AP, and sends an Announce frame to the PCP/AP, where the Announce frame includes cluster information of a second S-AP and an available cluster offset bitmap of the first S-AP, so that the PCP/AP selects one S-AP from the first S-AP and the second S-AP as a to-be-joined S-AP according to the available cluster offset bitmap of the first S-AP, signal quality and a state of each Beacon SP included in a BI of the first S-AP, and the cluster information of the second S-AP, and joins a centralized cluster of the to-be-joined S-AP, thereby implementing joining a centralized cluster. In addition, because the to-be-joined S-AP is selected according to the available cluster offset bitmap of the first S-AP, the signal quality and the state of each Beacon SP included in the BI of the first S-AP, and the cluster information of the second S-AP, stability of a joined centralized cluster is improved.

A person of ordinary skill in the art may understand that all or some of the steps of the foregoing embodiments may be implemented by hardware or a program instructing related hardware. The program may be stored in a computer-readable storage medium. The foregoing storage medium may include: a read-only memory, a magnetic disk, or an optical disc.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. A method for joining a centralized cluster, the method comprising:
   receiving a directional multi-gigabit beacon frame (DMG Beacon frame) sent by a first synchronization access point (S-AP), wherein the DMG Beacon frame comprises cluster information of the first S-AP;
   measuring, according to the cluster information of the first S-AP, signal quality and a state of each beacon scheduled service period (Beacon SP) comprised in a beacon interval (BI) of the first S-AP;
   when a Beacon SP whose state is an idle state is obtained by means of measurement, associating the Beacon SP with the first S-AP as a non-personal basic service set control point PCP/non-access point AP station (STA), and receiving an announce frame sent by the first S-AP, wherein the Announce frame comprises cluster information of a second S-AP and an available cluster offset bitmap of the first S-AP, the second S-AP is another S-AP, except the first S-AP, on each channel in a channel group in which the first S-AP is located, and the available cluster offset bitmap of the first S-AP is configured to store the state of each Beacon SP comprised in the BI of the first S-AP;
   selecting a S-AP from the first S-AP and the second S-AP as a to-be-joined S-AP according to the available cluster offset bitmap of the first S-AP, the signal quality and the state of each Beacon SP comprised in the BI of the first S-AP, and the cluster information of the second S-AP; and
   joining a centralized cluster of the to-be-joined S-AP.

2. The method according to claim 1, wherein:
   the cluster information of the first S-AP comprises BI duration, cluster synchronization information, and clustering control information of the first S-AP, and an identity of a channel on which the first S-AP is located; and
   measuring, according to the cluster information of the first S-AP, signal quality and a state of each beacon scheduled service period Beacon SP comprised in a beacon interval BI of the first S-AP comprises:
   determining, according to the cluster synchronization information, the BI duration, and the clustering control information of the first S-AP, a timing start moment of each Beacon SP comprised in the BI of the first S-AP, and
   performing, on the channel corresponding to the identity of the channel on which the first S-AP is located and according to the timing start moment of each Beacon SP comprised in the BI of the first S-AP, measurement on each Beacon SP comprised in the BI of the first S-AP, and obtaining, by means of measurement, the signal quality and the state of each Beacon SP comprised in the BI of the first S-AP.

3. The method according to claim 1, wherein selecting one S-AP from the first S-AP and the second S-AP as a to-be-joined S-AP according to the available cluster offset bitmap of the first S-AP, the signal quality and the state of each Beacon SP comprised in the BI of the first S-AP, and the cluster information of the second S-AP comprises:
   when a ratio of a quantity of Beacon SPs whose signal quality exceeds a preset threshold to a quantity of Beacon SPs whose state is an occupied state is greater than a preset ratio, determining, according to the available cluster offset bitmap of the first S-AP and the signal quality and the state of each Beacon SP comprised in the BI of the first S-AP, whether to join a centralized cluster of the first S-AP; and
   when it is determined to join the centralized cluster of the first S-AP, determining the first S-AP as the to-be-joined S-AP.

4. The method according to claim 3, wherein the method further comprises:
   when it is determined not to join the centralized cluster of the first S-AP, measuring, according to the cluster information of the second S-AP, signal quality and a state of each Beacon SP comprised in a BI of the second S-AP;
   calculating a ratio of a quantity of Beacon SPs that are comprised in the BI of the second S-AP and whose signal quality exceeds the preset threshold to a quantity of Beacon SPs that are comprised in the BI of the second S-AP and whose state is an occupied state; and
   selecting a second S-AP with a highest ratio, and determining the second S-AP with the highest ratio as the to-be-joined S-AP.

5. The method according to claim 1, wherein:
   the channel group comprises one first channel and two second channels, wherein a bandwidth resource occupied by the first channel is the same as that occupied by the two second channels, and the first channel overlaps the two second channels in frequency; and when a PCP/AP is a PCP/AP located on the second channel, after the joining a centralized cluster of the to-be-joined S-AP, the method further comprises:
receiving cluster information, sent by the to-be-joined S-AP, of a new S-AP newly joining the first channel, measuring, according to the cluster information of the new S-AP, signal quality and a state of each Beacon SP comprised in a BI of the new S-AP, and determining, according to the signal quality and the state of each Beacon SP comprised in the BI of the new S-AP, whether to join a centralized cluster of the new S-AP.

6. The method according to claim 1, wherein:
the cluster information of the second S-AP comprises BI duration, cluster synchronization information, and clustering control information of the second S-AP, and an identity of a channel on which the second S-AP is located;
the Announce frame comprises an extended cluster report information element (IE) of the second S-AP, wherein the extended cluster report IE comprises a reported BI duration field, a next beacon transmission interval (BTI offset field, a clustering control report field, and a cluster channel number field; and
the reported BI duration field is configured to carry the BI duration of the second S-AP, the next BTI offset field is configured to carry the cluster synchronization information of the second S-AP, the clustering control report field is configured to carry the clustering control information of the second S-AP, and the cluster channel number field is configured to carry the identity of the channel on which the second S-AP is located.

7. The method according to claim 6, wherein:
the Announce frame further comprises the available cluster offset bitmap of the second S-AP; and
the extended cluster report IE further comprises an available cluster offset bitmap field, wherein the available cluster offset bitmap field is configured to carry the available cluster offset bitmap of the second S-AP.

8. A method for joining a centralized cluster, the method comprising:
sending a directional multi-gigabit beacon frame (DMG Beacon frame) to a personal basic service set control point/access point (PCP/AP), wherein the DMG Beacon frame comprises cluster information of a first synchronization access point (S-AP), to enable the PCP/AP to measure, according to the cluster information of the first S-AP, signal quality and a state of each beacon scheduled service period (Beacon SP) comprised in a beacon interval (BI) of the first S-AP; and
when a Beacon SP whose state is an idle state is obtained by means of measurement by the PCP/AP, associating the Beacon SP with the PCP/AP, and sending an announce frame to the PCP/AP, wherein the Announce frame comprises cluster information of a second S-AP and an available cluster offset bitmap of the first S-AP, the second S-AP is another S-AP, except the first S-AP, on each channel in a channel group in which the first S-AP is located, and the available cluster offset bitmap of the first S-AP is configured to store the state of each Beacon SP comprised in the BI of the first S-AP, to enable the PCP/AP to select one S-AP from the first S-AP and the second S-AP as a to-be-joined S-AP according to the available cluster offset bitmap of the first S-AP, the signal quality and the state of each Beacon SP comprised in the BI of the first S-AP, and the cluster information of the second S-AP, and joins a centralized cluster of the to-be-joined S-AP.

9. The method according to claim 8, wherein:
the channel group comprises one first channel and two second channels, wherein a bandwidth resource occupied by the first channel is the same as that occupied by the two second channels, and the first channel overlaps the two second channels in frequency; and
the method further comprises:
receiving cluster information, sent by a centralized coordination service root (CCSR), of a new S-AP newly joining the first channel, and broadcasting, by using an extended cluster report information element (IE), the cluster information of the new S-AP to all PCP/APs comprised in a centralized cluster of the first S-AP, to enable a PCP/AP located on the second channel to determine, according to the cluster information of the new S-AP, whether to join a centralized cluster of the new S-AP.

10. The method according to claim 9, wherein broadcasting, by using an extended cluster report information element IE, the cluster information of the new S-AP to all PCP/APs comprised in a centralized cluster of the first S-AP comprises:
broadcasting an Announce frame or a DMG Beacon frame to all the PCP/APs comprised in the centralized cluster of the first S-AP, wherein the Announce frame or the DMG Beacon frame comprises the extended cluster report IE, and the extended cluster report IE comprises the cluster information of the new S-AP.

11. The method according to claim 9, wherein the method further comprises:
when it is determined to join the centralized cluster of the new S-AP, broadcasting, by using a DMG Beacon frame or an Announce frame, a cluster switching announcement IE to all the PCP/APs comprised in the centralized cluster of the first S-AP, so as to broadcast a cluster switching decision of the first S-AP to all the PCP/APs comprised in the centralized cluster of the first S-AP.

12. The method according to claim 9, wherein after receiving cluster information, sent by a centralized coordination service root (CCSR), of a new S-AP newly joining the first channel, the method further comprises:
when the first S-AP is located on the second channel, measuring, according to the cluster information of the new S-AP, signal quality and a state of each Beacon SP comprised in a BI of the new S-AP, and determining, according to the signal quality and the state of each Beacon SP comprised in the BI of the new S-AP, whether to join the centralized cluster of the new S-AP.

13. An apparatus for joining a centralized cluster, the apparatus comprising:
a processor;
a memory coupled to the processor, the memory storing instructions that, when executed by the processor, cause the apparatus to:
receive a directional multi-gigabit beacon frame (DMG Beacon frame) sent by a first synchronization access point (S-AP), wherein the DMG Beacon frame comprises cluster information of the first S-AP;
measure, according to the cluster information of the received first S-AP, signal quality and a state of each beacon scheduled service period (Beacon SP) comprised in a beacon interval (BI) of the first S-AP;
when a Beacon SP whose state is an idle state is obtained by means of measurement, associate the Beacon SP with the first S-AP as a non-personal basic service set control point PCP/non-access point AP station (STA), and receive an announce frame sent by the first S-AP, wherein the Announce frame comprises cluster information of a second S-AP and an available cluster offset bitmap of the first S-AP, the second S-AP is another S-AP, except the first S-AP, on each channel in a channel group in which the first S-AP is located, and the available cluster offset bitmap of the first S-AP is configured to store the state of each Beacon SP comprised in the BI of the first S-AP;

select one S-AP from the first S-AP and the second S-AP as a to-be-joined S-AP according to the available cluster offset bitmap of the first S-AP, the measured signal quality and the measured state of each Beacon SP comprised in the BI of the first S-AP, and the received cluster information of the second S-AP; and join a selected centralized cluster of the to-be-joined S-AP.

14. The apparatus according to claim 13, wherein:
the cluster information of the first S-AP comprises BI duration, cluster synchronization information, clustering control information of the first S-AP, and an identity of a channel on which the first S-AP is located; and
the memory comprises instructions that, when executed by the processor, cause the apparatus to:
determine, according to the cluster synchronization information, the BI duration, and the clustering control information of the first S-AP, a timing start moment of each Beacon SP comprised in the BI of the first S-AP, and
perform, on the channel corresponding to the identity of the channel on which the first S-AP is located and according to the determined timing start moment of each Beacon SP comprised in the BI of the first S-AP, measurement on each Beacon SP comprised in the BI of the first S-AP, and obtain, by means of measurement, the signal quality and the state of each Beacon SP comprised in the BI of the first S-AP.

15. The apparatus according to claim 13, wherein the memory comprises instructions that, when executed by the processor, cause the apparatus to:
when a ratio of a quantity of Beacon SPs whose signal quality exceeds a preset threshold to a quantity of Beacon SPs whose state is an occupied state is greater than a preset ratio, determine, according to the available cluster offset bitmap of the first S-AP and the signal quality and the state of each Beacon SP comprised in the BI of the first S-AP, whether to join a centralized cluster of the first S-AP; and
when it is determined to join the centralized cluster of the first S-AP, determine the first S-AP as the to-be-joined S-AP.

16. The apparatus according to claim 15, wherein the memory comprises instructions that, when executed by the processor, cause the apparatus to:
when it is determined not to join the centralized cluster of the first S-AP, measure, according to the cluster information of the second S-AP, signal quality and a state of each Beacon SP comprised in a BI of the second S-AP;
calculate a ratio of a quantity of Beacon SPs that are comprised in the BI of the second S-AP and whose signal quality measured exceeds the preset threshold to a quantity of Beacon SPs that are comprised in the BI of the second S-AP and whose state is an occupied state; and select a second S-AP with a highest ratio, and determine the second S-AP with the highest ratio as the to-be-joined S-AP.

17. The apparatus according to claim 13, wherein:
the channel group comprises one first channel and two second channels, wherein a bandwidth resource occupied by the first channel is the same as that occupied by the two second channels, and the first channel overlaps the two second channels in frequency; and
the memory comprises instructions that, when executed by the processor, cause the apparatus to:
when the apparatus is a PCP/AP located on the second channel, receive cluster information, sent by the to-be-joined S-AP, of a new S-AP newly joining the first channel, measure, according to the cluster information of the new S-AP, signal quality and a state of each Beacon SP comprised in a BI of the new S-AP, and determine, according to the signal quality and the state of each Beacon SP comprised in the BI of the new S-AP, whether to join a centralized cluster of the new S-AP.

18. The apparatus according to claim 13, wherein:
the cluster information of the second S-AP comprises BI duration, cluster synchronization information, and clustering control information of the second S-AP, and an identity of a channel on which the second S-AP is located;
the Announce frame comprises an extended cluster report information element IE of the second S-AP, wherein the extended cluster report IE comprises a reported BI duration field, a next beacon transmission interval BTI offset field, a clustering control report field, and a cluster channel number field; and
the reported BI duration field is configured to carry the BI duration of the second S-AP, the next BTI offset field is configured to carry the cluster synchronization information of the second S-AP, the clustering control report field is configured to carry the clustering control information of the second S-AP, and the cluster channel number field is configured to carry the identity of the channel on which the second S-AP is located.

19. The apparatus according to claim 18, wherein the Announce frame further comprises the available cluster offset bitmap of the second S-AP, and the extended cluster report IE further comprises an available cluster offset bitmap field, wherein the available cluster offset bitmap field is configured to carry the available cluster offset bitmap of the second S-AP.

20. An apparatus for joining a centralized cluster, the apparatus comprising:
a processor;
a memory coupled to the processor, the memory storing instructions that, when executed by the processor, cause the apparatus to:
send a directional multi-gigabit beacon frame (DMG Beacon frame) to a personal basic service set control point/access point (PCP/AP), wherein the DMG Beacon frame comprises cluster information of a first synchronization access point (S-AP), to enable the PCP/AP to measure, according to the cluster information of the first S-AP, signal quality and a state of each beacon scheduled service period (Beacon SP) comprised in a beacon interval (BI) of the first S-AP; and
when a Beacon SP whose state is an idle state is obtained by means of measurement by the PCP/AP, associate the Beacon SP with the PCP/AP, and send an announce frame to the PCP/AP, wherein the Announce frame comprises cluster information of a second S-AP and an available cluster offset bitmap of the first S-AP, the second S-AP is another S-AP, except the first S-AP, on each channel in a channel group in which the first S-AP is located, and the available cluster offset bitmap of the first S-AP is configured to store the state of each Beacon SP comprised in the BI of the first S-AP, to enable the PCP/AP to select one S-AP from the first S-AP and the second S-AP as a to-be-joined S-AP according to the available cluster offset bitmap of the first S-AP, the signal quality and the state of each Beacon SP comprised in the BI of the first S-AP, and the cluster information of the second S-AP, and joins a centralized cluster of the to-be-joined S-AP.

21. The apparatus according to claim 20, wherein:
the channel group comprises one first channel and two second channels, wherein a bandwidth resource occupied by the first channel is the same as that occupied by the two second channels, and the first channel overlaps the two second channels in frequency; and
the memory comprises instructions that, when executed by the processor, cause the apparatus to:
  receive cluster information, sent by a centralized coordination service root (CCSR), of a new S-AP newly joining the first channel, and broadcast, by using an extended cluster report information element (IE), the cluster information of the new S-AP to all PCP/APs comprised in a centralized cluster of the first S-AP, to enable a PCP/AP located on the second channel to determine, according to the cluster information of the new S-AP, whether to join a centralized cluster of the new S-AP.

22. The apparatus according to claim 21, wherein:
the memory comprises instructions that, when executed by the processor, cause the apparatus to:
  receive the cluster information, sent by the CCSR, of the new S-AP newly joining the first channel, and broadcast an Announce frame or a DMG Beacon frame to all the PCP/APs comprised in the centralized cluster of the first S-AP, wherein the Announce frame or the DMG Beacon frame comprises the extended cluster report IE, and the extended cluster report IE comprises the cluster information of the new S-AP.

23. The apparatus according to claim 22, wherein the memory comprises instructions that, when executed by the processor, cause the apparatus to:
  when it is determined to join the centralized cluster of the new S-AP, broadcast, by using a DMG Beacon frame or an Announce frame, a cluster switching announcement IE to all the PCP/APs comprised in the centralized cluster of the first S-AP, so as to broadcast a cluster switching decision of the first S-AP to all the PCP/APs comprised in the centralized cluster of the first S-AP.

24. The apparatus according to claim 21, wherein the memory comprises instructions that, when executed by the processor, cause the apparatus to:
  when the first S-AP is located on the second channel, measure, according to the cluster information of the new S-AP, signal quality and a state of each Beacon SP comprised in a BI of the new S-AP, and determine, according to the signal quality and the state of each Beacon SP comprised in the BI of the new S-AP, whether to join the centralized cluster of the new S-AP.

* * * * *